US012633972B2

(12) United States Patent
Hedayat

(10) Patent No.: US 12,633,972 B2
(45) Date of Patent: May 19, 2026

(54) AGGREGATION METHODS AND SYSTEMS FOR MULTI-USER MIMO OR OFDMA OPERATION

(71) Applicant: Atlas Global Technologies LLC, Austin, TX (US)

(72) Inventor: Ahmad Reza Hedayat, Aliso Viejo, CA (US)

(73) Assignee: Atlas Global Technologies LLC, Austin, TX (US)

( * ) Notice: Subject to any disclaimer, the term of this patent is extended or adjusted under 35 U.S.C. 154(b) by 0 days.

(21) Appl. No.: 18/755,308

(22) Filed: Jun. 26, 2024

(65) Prior Publication Data
US 2024/0348299 A1 Oct. 17, 2024

Related U.S. Application Data

(63) Continuation of application No. 17/035,507, filed on Aug. 21, 2023, now Pat. No. 12,057,900, which is a
(Continued)

(51) Int. Cl.
*H04L 5/00* (2006.01)
*H04B 7/0452* (2017.01)
*H04L 27/26* (2006.01)

(52) U.S. Cl.
CPC ......... *H04B 7/0452* (2013.01); *H04L 5/0007* (2013.01); *H04L 5/0037* (2013.01);
(Continued)

(58) Field of Classification Search
CPC ... H04W 72/121; H04W 72/23; H04W 24/00; H04W 72/0453; H04L 27/2613;
(Continued)

(56) References Cited

U.S. PATENT DOCUMENTS 9,065,502 B2    6/2015  Lee et al.
9,325,463 B2    4/2016  Azizi et al.
(Continued)

FOREIGN PATENT DOCUMENTS

WO      WO-2015081269 A1 *  6/2015  ......... H04L 27/2646

OTHER PUBLICATIONS

Non-Final Office Action for U.S. Appl. No. 15/083,185, mailed Sep. 11, 2017, 13 pages.
(Continued)

*Primary Examiner* — Romani Ohri
(74) *Attorney, Agent, or Firm* — Nutter McClennen & Fish LLP

(57) ABSTRACT

An access point (AP) is provided. The AP includes a processing device and a memory unit coupled to the processing device The memory unit includes instructions that when executed by the processing device cause the wireless device to determine a first set of stations (STAs) that are capable to receive downlink multi-user multiple input multiple output (DL MU MIMO) transmissions, determine a second set of stations (STAs) that are not capable to receive downlink multi-user multiple input multiple output (DL MU MIMO) transmissions, and transmit a downlink orthogonal frequency division multiple access protocol data unit (DL OFDMA PPDU) to the first set of (STAs) over sub-bands that are capable of DL MU MIMO and to the second set of (STAs) over sub-bands that are not capable of DL MU MIMO. A bandwidth of individual sub-bands are not the same.

20 Claims, 15 Drawing Sheets

Related U.S. Application Data continuation of application No. 15/991,889, filed on May 29, 2018, now Pat. No. 10,790,884, which is a continuation of application No. 15/083,185, filed on Mar. 28, 2016, now Pat. No. 9,998,185.

(60) Provisional application No. 62/271,870, filed on Dec. 28, 2015, provisional application No. 62/142,394, filed on Apr. 2, 2015, provisional application No. 62/139,574, filed on Mar. 27, 2015.

(52) U.S. Cl.
CPC ........ *H04L 5/0094* (2013.01); *H04L 27/2602* (2013.01); *H04L 5/0053* (2013.01); *H04L 27/2603* (2021.01)

(58) Field of Classification Search
CPC ............ H04L 27/2602; H04L 27/2603; H04B 7/0452; H04B 7/0413
See application file for complete search history.

(56) References Cited

U.S. PATENT DOCUMENTS

| | | | |
|---|---|---|---|
| 9,699,807 B2 | 7/2017 | Ghosh et al. | |
| 9,717,086 B2 | 7/2017 | Zhang et al. | |
| 9,998,185 B2 | 6/2018 | Hedayat | |
| 2011/0317569 A1* | 12/2011 | Kneckt | H04W 74/0833 |
| | | | 370/252 |
| 2012/0021688 A1* | 1/2012 | Bhattad | H04B 7/0452 |
| | | | 455/63.1 |
| 2013/0051260 A1 | 2/2013 | Liu | |
| 2013/0286959 A1 | 10/2013 | Lou et al. | |
| 2014/0211775 A1 | 7/2014 | Sampath et al. | |
| 2014/0294020 A1 | 10/2014 | You et al. | |
| 2015/0009894 A1 | 1/2015 | Vermani et al. | |
| 2015/0131640 A1 | 5/2015 | Seok et al. | |
| 2015/0139205 A1 | 5/2015 | Kenney et al. | |
| 2015/0163028 A1* | 6/2015 | Tandra | H04L 5/0044 |
| | | | 370/203 |
| 2015/0365972 A1 | 12/2015 | Seok | |
| 2016/0301451 A1* | 10/2016 | Seok | H04W 56/00 |
| 2016/0302156 A1 | 10/2016 | Choi et al. | |
| 2017/0033898 A1 | 2/2017 | Chun et al. | |
| 2017/0251432 A1 | 8/2017 | Park et al. | |
| 2017/0279570 A1* | 9/2017 | Kim | H04J 11/005 |

OTHER PUBLICATIONS

Notice of Allowance for U.S. Appl. No. 15/083,185, mailed Jan. 18, 2018, 8 pages.

Notice of Allowance for U.S. Appl. No. 15/083,185, mailed Feb. 9, 2020, 4 pages.

Non-Final Office Action U.S. Appl. No. 15/991,889, mailed Jan. 6, 2020, 18 pages.

Notice of Allowance for U.S. Appl. No. 15/991,889, mailed May 28, 2020, 8 pages.

LAN/MAN Standards Committee of the IEE Computer Society, "IEEE P802.11ahTM/D5.0 Draft Standar for Information technology—Telecommunications and information exchnage between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

LAN/MAN Standards Committee of the IEEE Computer Society, " IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan are networks—Specific requirements, Part 11: Wirless LAN Medium Access Control (MAC) and Physical Layer (PHY) Specifications," 2012.

Office Action for U.S. Appl. No. 17/035,507 dated Apr. 13, 2023, 14 pages.

Notice of Allowance for U.S. Appl. No. 17/035,507 dated Apr. 8, 2024, 8 pages.

* cited by examiner

1410

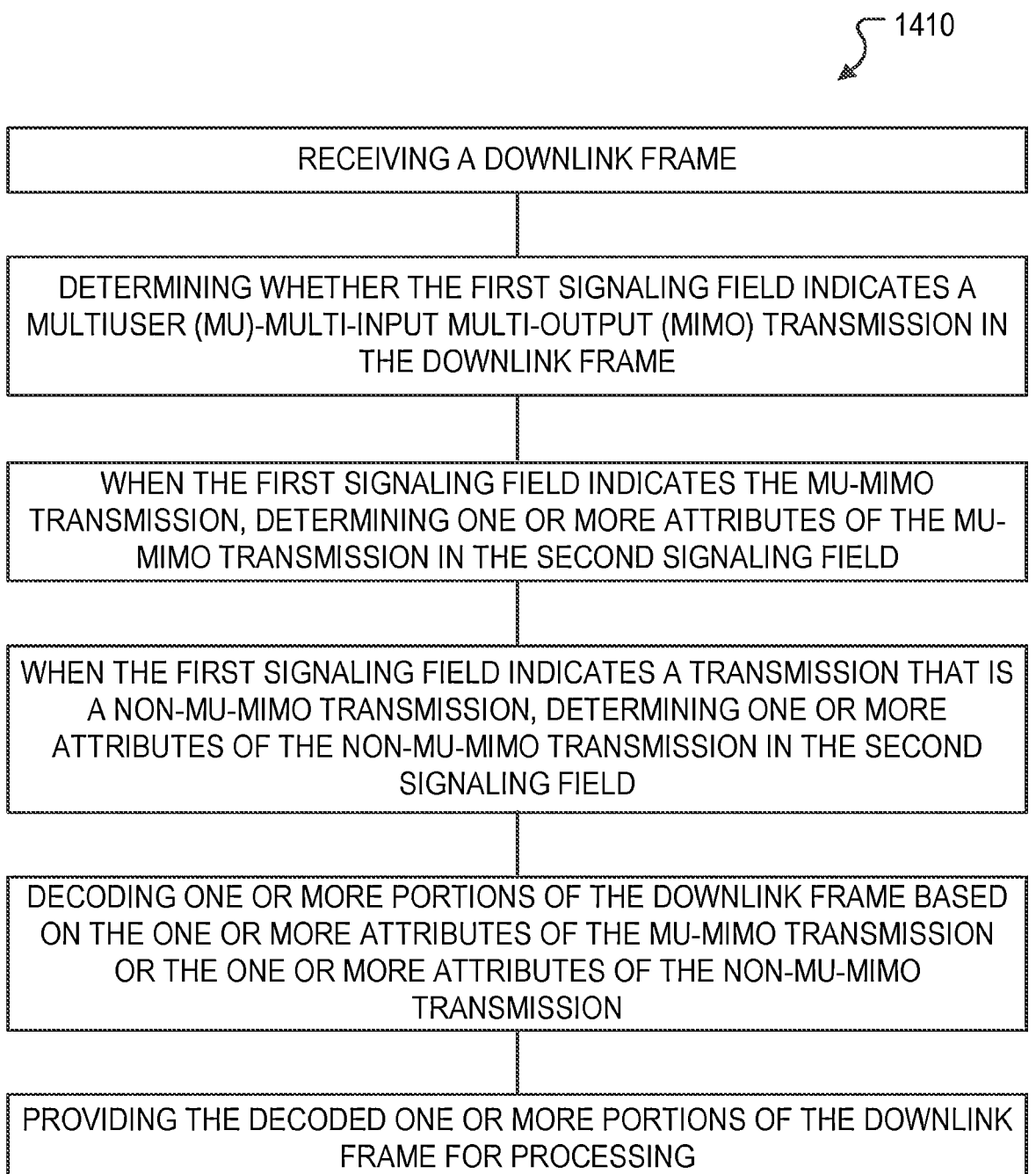

RECEIVING A DOWNLINK FRAME

DETERMINING WHETHER THE FIRST SIGNALING FIELD INDICATES A MULTIUSER (MU)-MULTI-INPUT MULTI-OUTPUT (MIMO) TRANSMISSION IN THE DOWNLINK FRAME

WHEN THE FIRST SIGNALING FIELD INDICATES THE MU-MIMO TRANSMISSION, DETERMINING ONE OR MORE ATTRIBUTES OF THE MU-MIMO TRANSMISSION IN THE SECOND SIGNALING FIELD

WHEN THE FIRST SIGNALING FIELD INDICATES A TRANSMISSION THAT IS A NON-MU-MIMO TRANSMISSION, DETERMINING ONE OR MORE ATTRIBUTES OF THE NON-MU-MIMO TRANSMISSION IN THE SECOND SIGNALING FIELD

DECODING ONE OR MORE PORTIONS OF THE DOWNLINK FRAME BASED ON THE ONE OR MORE ATTRIBUTES OF THE MU-MIMO TRANSMISSION OR THE ONE OR MORE ATTRIBUTES OF THE NON-MU-MIMO TRANSMISSION

PROVIDING THE DECODED ONE OR MORE PORTIONS OF THE DOWNLINK FRAME FOR PROCESSING

FIG. 14A

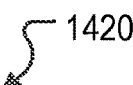

GENERATING A DOWNLINK FRAME FOR A MULTI-USER TRANSMISSION

PROVIDING THE DOWNLINK FRAME FOR THE MULTI-USER TRANSMISSION DIRECTED TO A PLURALITY OF STATIONS

FIG. 14B

RECEIVING A DOWNLINK FRAME

DETERMINING WHETHER THE FIRST SIGNALING FIELD INDICATES A MULTIUSER (MU)-MULTI-INPUT MULTI-OUTPUT (MIMO) TRANSMISSION

WHEN THE FIRST SIGNALING FIELD INDICATES THE MU-MIMO TRANSMISSION, DETERMINING ONE OR MORE ATTRIBUTES OF THE MU-MIMO TRANSMISSION IN THE SECOND SIGNALING FIELD

DECODING ONE OR MORE PORTIONS OF THE DOWNLINK FRAME BASED ON THE ONE OR MORE ATTRIBUTES OF THE MU-MIMO TRANSMISSION

PROVIDING THE DECODED ONE OR MORE PORTIONS OF THE DOWNLINK FRAME FOR PROCESSING

FIG. 14C

AGGREGATION METHODS AND SYSTEMS FOR MULTI-USER MIMO OR OFDMA OPERATION

CROSS-REFERENCE TO RELATED APPLICATIONS

This application is a continuation application of application Ser. No. 17/035,507, filed on Sep. 28, 2020, which is a continuation application of application Ser. No. 15/991,889, filed on May 29, 2018, now U.S. Pat. No. 10,790,884, which is a continuation application of application Ser. No. 15/083, 185, filed on Mar. 28, 2016, now U.S. Pat. No. 9,998,185, which claims the benefit of U.S. Provisional Application No. 62/271,870, filed on Dec. 28, 2015, U.S. Provisional Application No. 62/142,394, filed on Apr. 2, 2015, and U.S. Provisional Application No. 62/139,574, filed on Mar. 27, 2015, the entirety of each of which is incorporated herein by reference for all purposes.

TECHNICAL FIELD

The present description relates in general to wireless communication systems and methods, and more particularly to, for example, without limitation, aggregation methods and systems for multi-user (MU) multiple-input/multiple-output (MIMO) or orthogonal frequency-division multiple access (OFDMA) operation.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

FIGS. 14A through 14C illustrate flow charts of examples of aggregation methods for OFDMA operation.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

New multi-user (MU) transmissions, such as downlink (DL) orthogonal frequency division multiple access (OFDMA) and DL MU multiple-input/multiple-output (MIMO), provide new opportunities for next-generation WiFi technology. For example, OFDMA is a technique that can be used in WiFi technology in order to enhance the aggregation of multiple payloads that are destined to multiple stations (STAs) within the same frame. Due to this and other advantages, OFDMA technique is being considered for next generation WLAN technologies, including 802.11ax which is also referred to as high efficiency (HE) technology.

With OFDMA technique, there comes new opportunities and challenges that should be considered in the design of OFDMA signaling and procedures. Among the opportunities that are provided by OFDMA is the frequency selectivity gain, where AP would allocate resources to each STA where those allocated resources offer highest frequency-gain for that STA. Using acknowledgement procedures, the AP can obtain the information that is needed to harvest frequency selectivity gain for each STA in the subsequent DL or uplink (UL) OFDMA frames.

One or more aspects of the present disclosure describe methods that can be used between a pair of e.g., 802.11 nodes while they exchange frames in MU-MIMO or OFDMA format. In MU-MIMO or OFDMA transmission, the transmitter node, commonly an AP in 802.11 use cases, sends an MU-MIMO or OFDMA frame to several other clients. One or more aspects of the present disclosure provide several aggregation methods for DL MU-MIMO or OFDMA transmission. In addition, one or more aspects of the present disclosure provide methods to indicate the length of each payload that exists in a DL OFDMA physical layer convergence protocol (PLCP) protocol data unit (PPDU).

Figure 1:
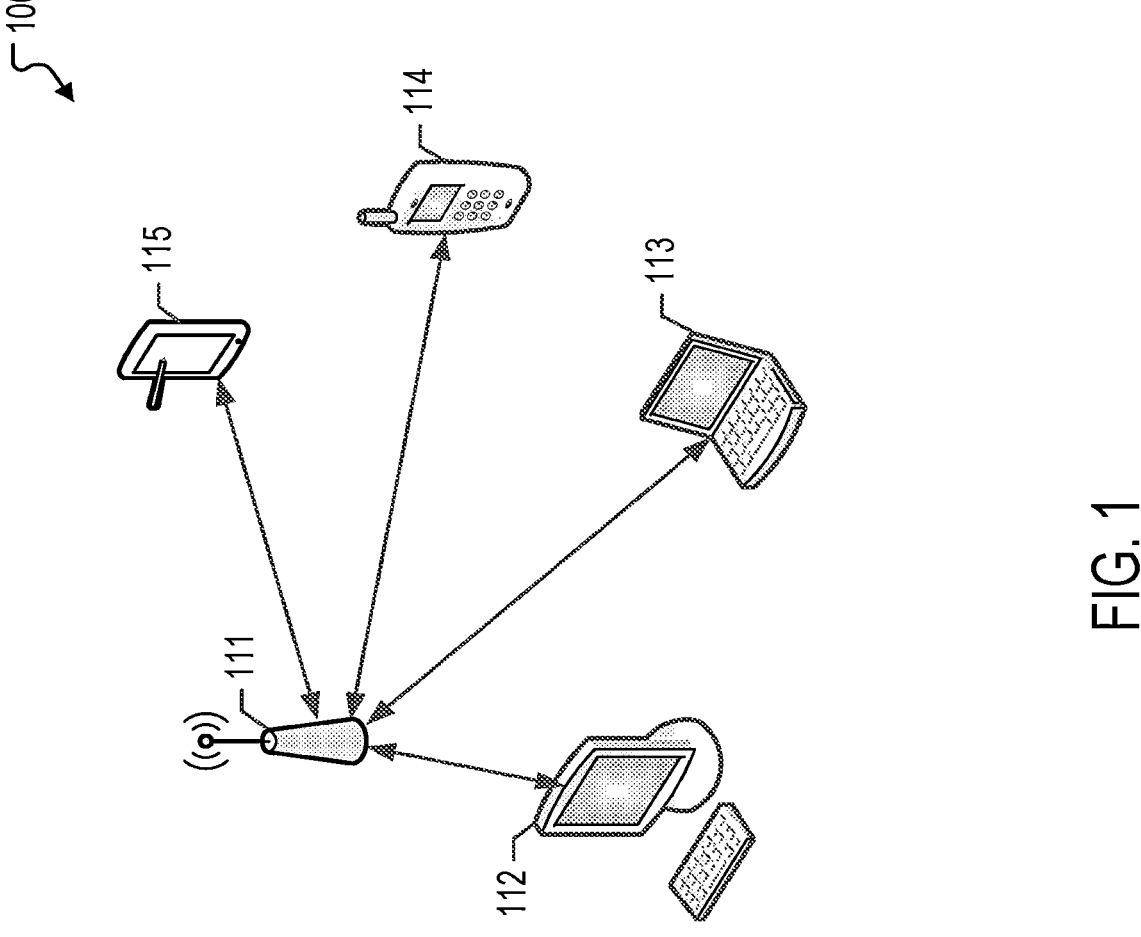
FIG. 1 illustrates a schematic diagram of an example of a wireless communication network.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a MAC layer and a physical (PHY) layer according to an IEEE 802.11 standard. In the example, at least one wireless communication device (e.g., device 111) is an access point (AP). An AP may be referred to as an AP STA or an AP device. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. An non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP HE STA, and an AP refers to a HE AP. In one or more aspects, a STA may act as an AP.

Figure 2:
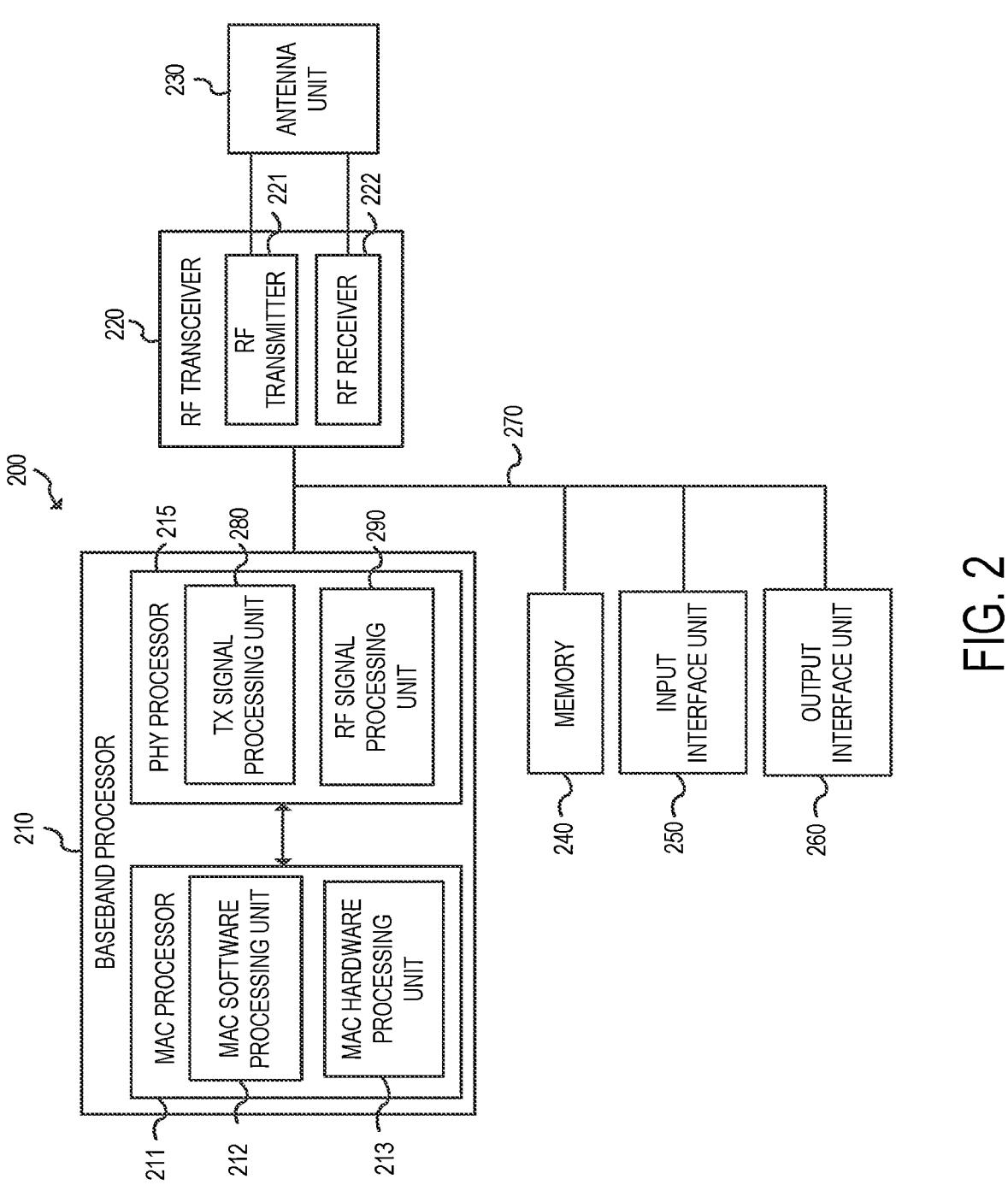
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
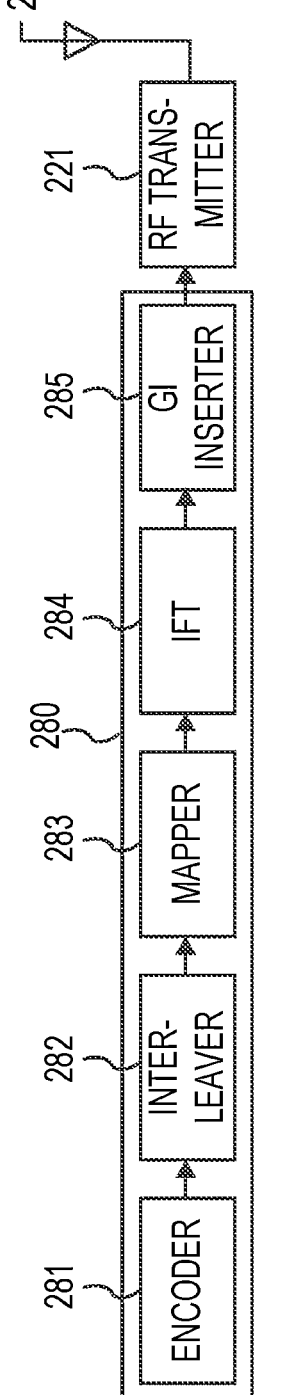
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams (Nss). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams (NsTs) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
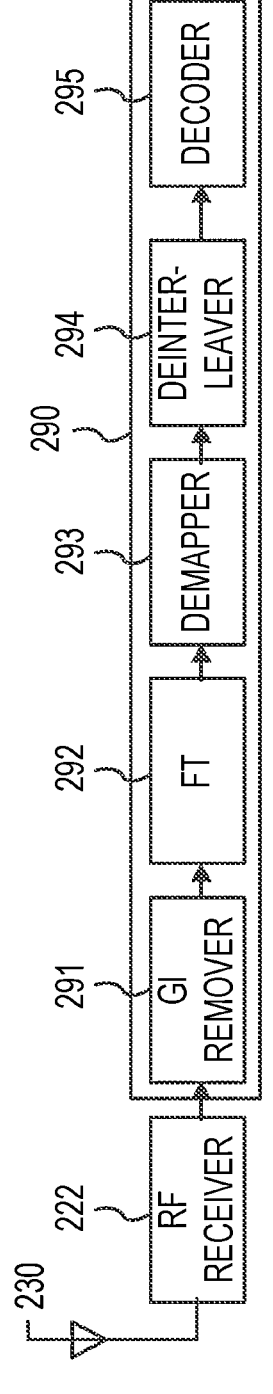
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may be a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC encoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
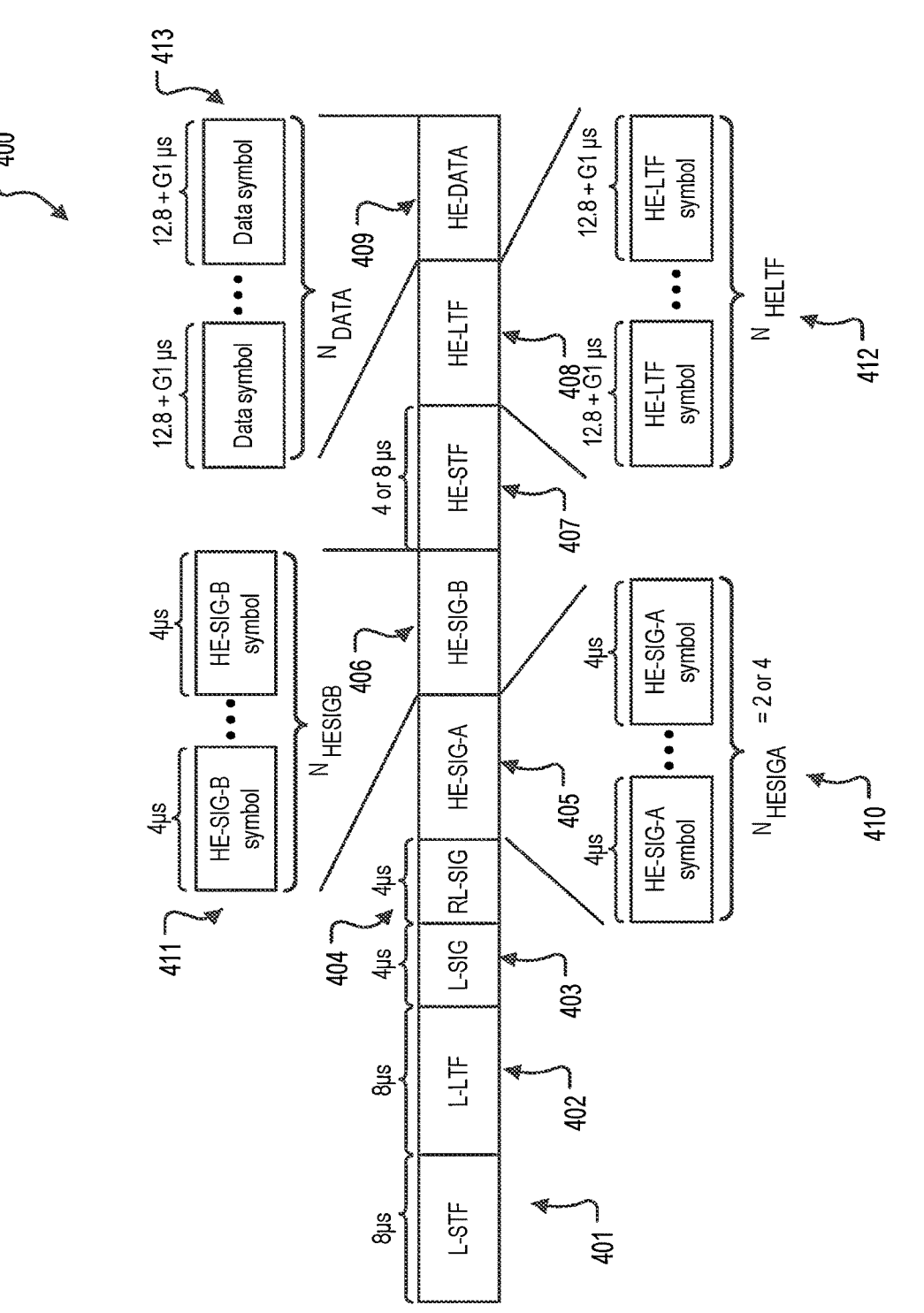
FIG. 4 illustrates a schematic diagram of an example of a format of a high efficiency (HE) physical layer convergence procedure (PLCP) protocol data unit (HE PPDU) frame.

FIG. 4 illustrates a schematic diagram of an example of a format of a high efficiency (HE) physical layer convergence procedure (PLCP) protocol data unit (HE PPDU) frame 400. A transmitting STA generates the PPDU frame 400 and transmits the PPDU frame 400 to a receiving STA. The receiving STA receives, detects, and processes the PPDU frame 400. The PPDU frame 400 includes an L-STF field 401, an L-LTF field 402, an L-SIG field 403, an RL-SIG field 404, an HE-SIG-A field 405, an HE-SIG-B field 406, an HE-STF field 407, an HE-LTF field 408, and an HE-DATA field 409. The HE-SIG-A field 405 includes NHESIGA symbols 410, the HE-SIG-B field 406 includes NHESIGB symbols 411, the HE-LTF field 408 includes NHELTF symbols 412, and the HE-DATA field 409 includes NDATA symbols 413. Table 1, shown below, describes fields of the PPDU frame 400 in more detail.

TABLE 1

| PPDU Frame | | | | | | |
|---|---|---|---|---|---|---|
| Element | Definition | Duration | DFT Period | GI | Subcarrier Spacing | Description |
| Legacy (L)-STF | Non-high throughput (HT) Short Training Field | 8 us | — | — | Equivalent to 1.250 KHz | L-STF of a non-trigger-based PPDU has a periodicity of 0.8 us with 10 periods |
| L-LTF | Non-HT Long Training Field | 8 us | 3.2 us | 1.6 us | 312.5 KHz | |
| L-SIG | Non-HT SIGNAL Field | 4 us | 3.2 us | 0.8 us | 312.5 KHz | |
| RL-SIG | Repeated Non-HT SIGNAL Field | 4 us | 3.2 us | 0.8 us | 312.5 KHz | |
| HE-SIG-A | HE SIGNAL A Field | $N_{HESIGA}$ * 4 us | 3.2 us | 0.8 us | 312.5 KHz | HE-SIG-A is duplicated on each 20 MHz segment after the legacy preamble to indicate HE common control information. $N_{HESIGA}$ means the number of OFDM symbols of the HE-SIG-A field and is equal to 2 or 4. |
| HE-SIG-B | HE SIGNAL B Field | $N_{HESIGB}$ * 4 us | 3.2 us | 0.8 us | 312.5 KHz | $N_{HESIGB}$ means the number of OFDM symbols of the HE-SIG-B field and is variable. DL MU packet contains HE-SIG-B. |

TABLE 1-continued

| | | | | | | |
|---|---|---|---|---|---|---|
| | | | PPDU Frame | | | |
| Element | Definition | Duration | DFT Period | GI | Subcarrier Spacing | Description |
| | | | | | | Single user (SU) packets and UL Trigger-based packets do not contain HE-SIG-B. |
| HE-STF | HE Short Training Field | 4 or 8 us | — | — | Non-trigger-based PPDU (equivalent to) 1,250 KHz Trigger-based PPDU: (equivalent to) 625 KHz | HE-STF of a non-trigger-based PPDU has a periodicity of 0.8 us with 5 periods. A non-trigger-based PPDU is not sent in response to a trigger frame. The HE-STF of a trigger-based PPDU has a periodicity of 1.6 us with 5 periods. A trigger-based PPDU is a UL PPDU sent in response to a trigger frame. |
| HE-LTF | HE Long Training Field | $N_{HELTF}$ * (DFT period + GI) us | 2 × LTF: 6.4 us, 4 × LTF: 12.8 us | Supports 0.8, 1.6, 3.2 us | 2 × LTF (equivalent to) 156.25 KHz, 4 × LTF: 78.125 KHz | HE PPDU may support 2 × LTF mode and 4 × LTF mode. In the 2 × LTF mode, HE-LTF symbol excluding GI is equivalent to modulating every other tone in an OFDM symbol of 12.8 us excluding GI, and then removing the second half of the OFDM symbol in the time domain. $N_{HELTF}$ means the number of HE-LTF symbols and is equal to 1, 2, 4, 6, or 8. |
| HE-DATA | HE DATA Field | $N_{DATA}$ (DFT period + GI) us | 12.8 us | Supports 0.8, 1.6, 3.2 us | 78.125 KHz | $N_{DATA}$ means the number of HE data symbols |

Figure 5:
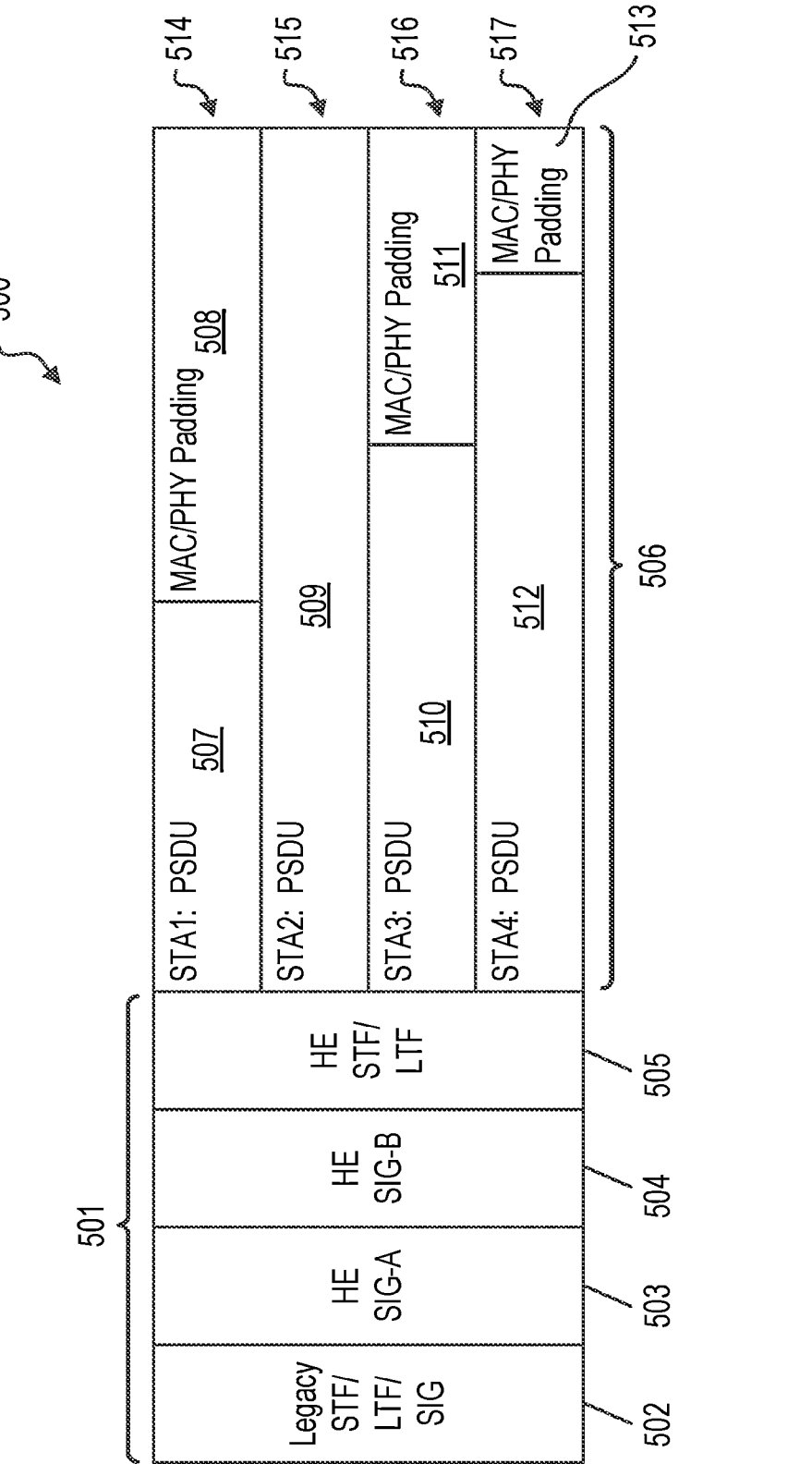
FIG. 5 illustrates a schematic diagram of an example of a downlink (DL) OFDMA PPDU transmission to a set of stations (STAs).

FIG. 5 illustrates a schematic diagram of an example of a DL OFDMA PPDU 500 transmission to a set of STAs. The AP transmits a DL OFDMA PPDU (e.g., 500) in a HE PPDU format (e.g., 400). The HE PPDU format 400 is composed of the Legacy PLCP 502 (which consists of STF, LTF and SIG symbols that are modulated with FFT size of 64 on 20 MHz sub-channel and is duplicated every 20 MHz if the DL OFDMA PPDU has wider bandwidth than 20 MHZ), the HE PLCP (which consists of all or part of HE SIG-A 503 using FFT size of 64 and duplicated on all the 20 MHz sub-channels that the DL OFDMA PPDU consists of, and HE-STF 505, HE-LTF 505, HE SIG-B 504 using FFT size of either 64 or 256 and modulated over the entire bandwidth of the DL OFDMA PPDU) and the PSDU 506 (which has payloads for multiple STAs, and is modulated using FFT size of 256).

In FIG. 5, the payloads are for STA1, STA2, STA3, and STA4. The AP transmits the payloads through sub-bands of possibly varying bandwidth, and possibly non-contiguous bands for a given STA. The bandwidth of individual sub-bands are the same due to the size of the payload sent to each STA and based on the AP's decision. Each PSDU (e.g., 514, 515, 516, 517) contains the payload that is destined to the STA (e.g., STA1, STA2, STA3, STA4) plus the necessary MAC padding and/or PHY padding (e.g., 508, 511, 513). The bandwidth in this embodiment may be 20 MHz, where each of the sub-bands have 5 MHz bandwidth, or the bandwidth may be 40 MHz, where each of the sub-bands have 10 MHz bandwidth, or the bandwidth may be 80 MHz, where each of the sub-bands have 20 MHZ bandwidth.

In one aspect of the disclosure, a frame may refer to a MU-MIMO frame, an OFDMA frame, a high efficiency (HE) OFDMA frame, an OFDMA PPDU, a HE OFDMA PPDU, a PPDU, a MU PPDU or vice versa. In one aspect, a frame may be a downlink (DL) frame or an uplink (UL) frame. In one aspect, a DL OFDMA PPDU (e.g., 500) includes a header (e.g., 501) and a payload (e.g., 506). In one aspect, HE refers to the IEEE 802.11ax specification, 802.11ax, 11ax, or vice versa.

Figure 6:
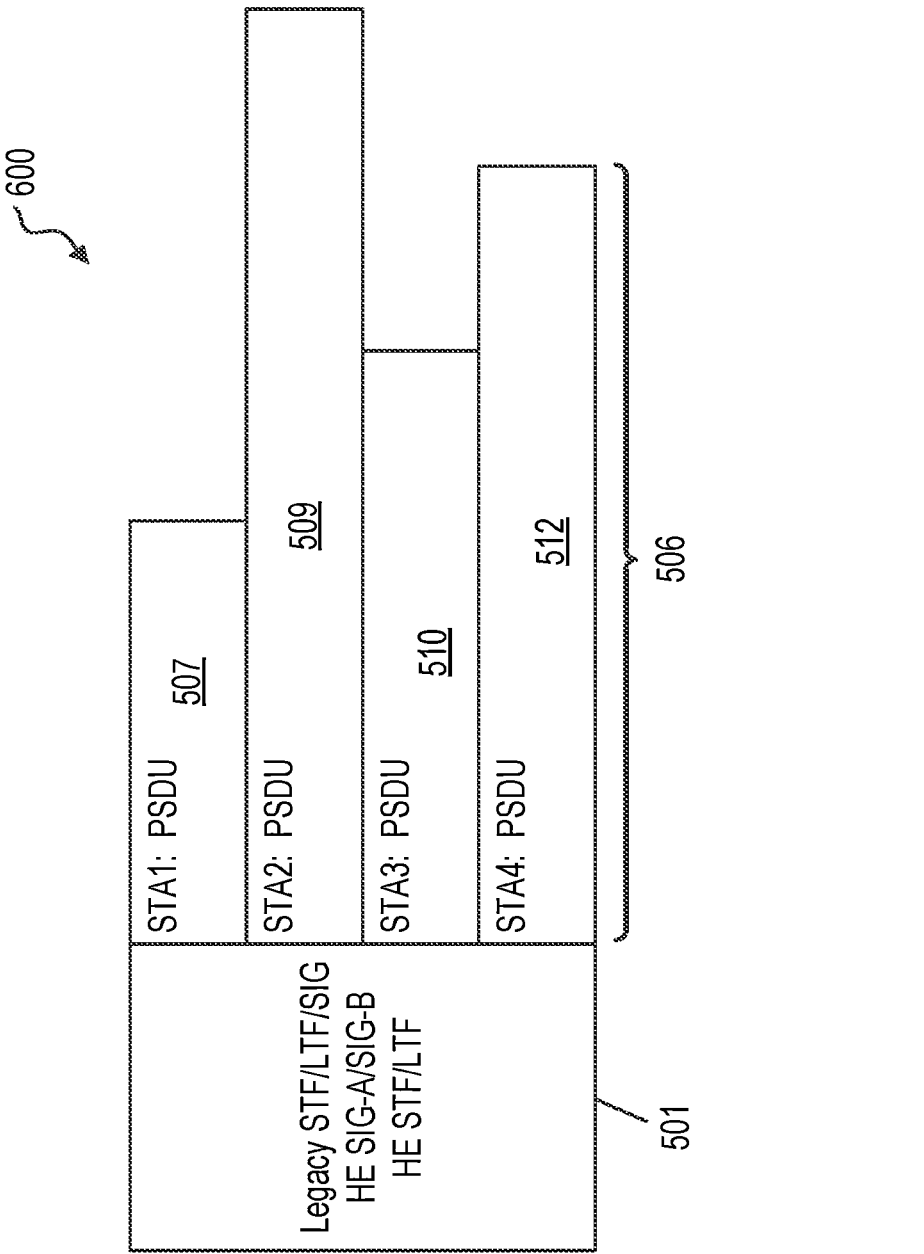
FIG. 6 illustrates a schematic diagram of an example of a DL OFDMA PPDU transmission to a set of STAs.

FIG. 6 illustrates a schematic diagram of an example of a DL OFDMA PPDU 600 transmission to a set of STAs. FIG. 6 shows a similar transmission as in FIG. 5 except that the PSDU for each STA contains a payload (e.g., 507, 509, 510, 512) without excessive MAC padding (but possibly the short PHY padding is included). Due to avoidance of the MAC padding, the PSDUs have variable size. In this respect, the PSDU with the longest size, determines the size of the overall DL OFDMA PPDU 600. The bandwidth in this embodiment may be 20 MHz, where each of the sub-bands have 5 MHz bandwidth, or the bandwidth may be 40 MHz, where each of the sub-bands have 10 MHz bandwidth, or the bandwidth may be 80 MHz, where each of the sub-bands have 20 MHz bandwidth. In the latter case where each PSDU occupies a 20 MHz sub-band, note that the AP places the longest PSDU on the primary channel of the BSS operation (to avoid ambiguity in channel availability among the STAs that are associated with the same AP and belong to the same BSS). In this case, each PSDU has a different length and individual PSDU length is indicated in either HE SIG-A or HE SIG-B (e.g., 501). The methods to indicate the length of each PSDU may vary by design. For instance, in one embodiment, each PSDU or payload length is explicitly indicated by the absolute values with PSDU length in bytes. For instance, in FIG. 6, the length of the PSDU that is destined to each STA is encoded within HE SIG-A or HE SIG-B in terms of the total bytes of the PSDU (along with other attributes of each PSDU such as a modulation coding scheme (MCS), the number of spatial streams (NSS), etc.). In another embodiment, each PSDU length is indicated in absolute values of the OFDM symbols. For instance, in FIG. 6, the length for PSDU that is destined to each STA is encoded within HE SIG-A or SIG-B in terms of the number of OFDM symbols that the PSDU spans (along with other attributes of each PSDU such as MCS, NSS, etc.).

Figure 7:
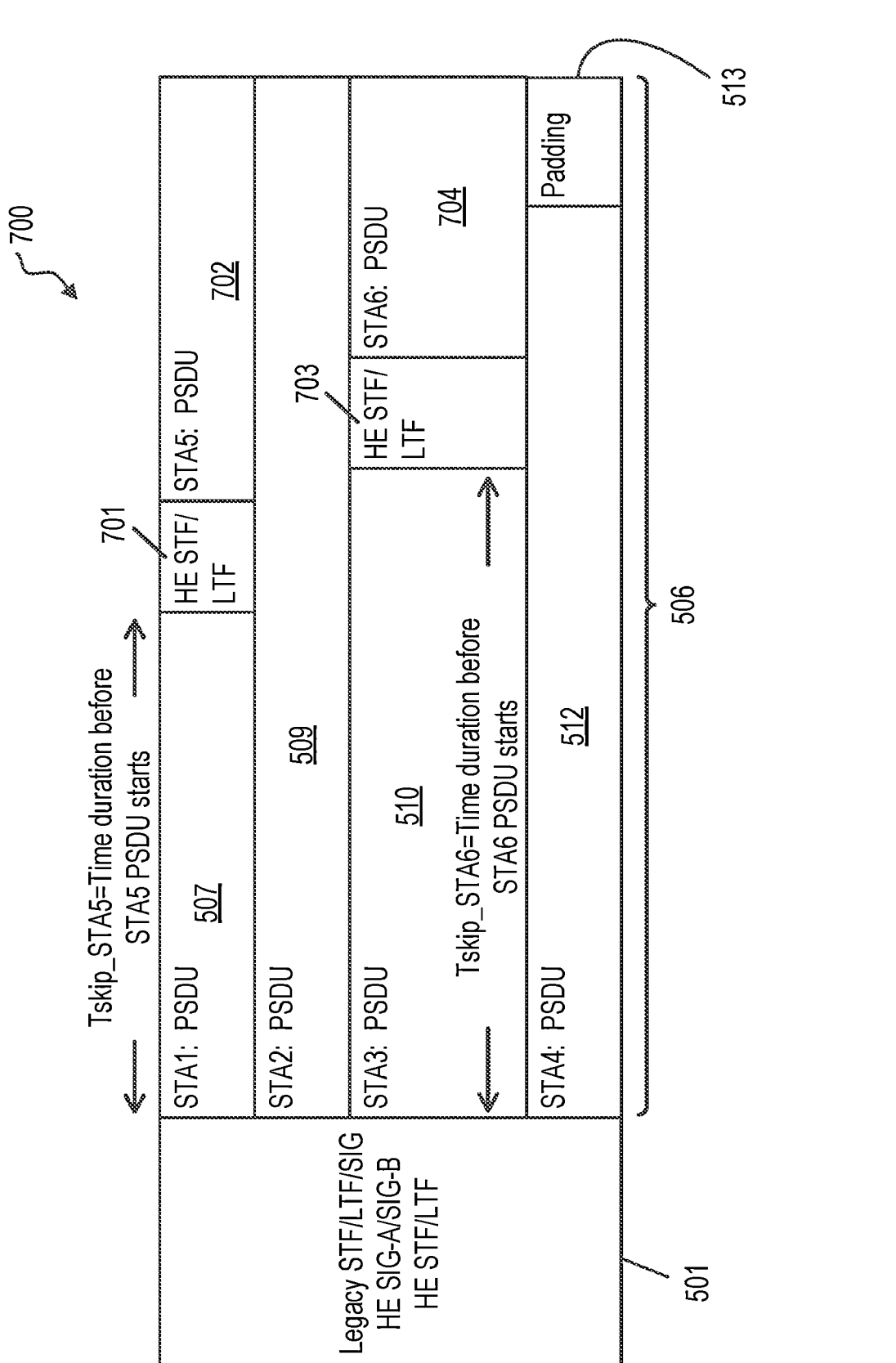
FIG. 7 illustrates a schematic diagram of an example of a DL OFDMA PPDU transmission to a set of STAs.

FIG. 7 illustrates a schematic diagram of an example of a DL OFDMA PPDU 700 transmission to a set of STAs. In this example, the bandwidth of individual sub-bands are the same due to the size of the payload sent to each STA and based on the AP's decision. FIG. 7 shows a transmission as in FIG. 6, except that the PSDU for each STA does not contain excessive MAC padding (but possibly short MAC and/or PHY padding are included). In an embodiment, multiple PSDUs may be within a single sub-band, where each PSDU occupy a time segment. Each PSDU contains the payload that is destined to the STA but with no or low amounts of MAC padding and PHY padding (e.g., not exceeding a threshold amount of padding that is considered excessive). The AP avoids excessive MAC padding and instead adds another PSDU (e.g., 702, 704), equivalently another PSDU in a new time-segment, in each sub-band that has shorter length compared to the length of the DL OFDM PPDU 700. Due to the avoidance of MAC padding, the PSDUs may have variable size, but to align the ending of multiple PSDUs, the AP may assign shorter payloads to other STAs in a sub-band. To add a subsequent PSDU in a sub-band, the AP first adds a HE STF and/or HE LTF (e.g., 701, 703), which helps in the PHY processing at the receiving STA. Then the AP adds the subsequent PSDU (e.g., 702, 704) after the added HE STF/LTF symbols.

The bandwidth in this embodiment may be 20 MHZ, where each of the sub-bands have 5 MHz bandwidth, or the bandwidth may be 40 MHz, where each of the sub-bands have 10 MHZ bandwidth, or the bandwidth may be 80 MHZ, where each of the sub-bands have 20 MHz bandwidth. Therefore, in one embodiment, additional HE STF/LTF symbols appear in the sub-band portion of the payload (e.g., 506) of the PPDU 700, where the additional HE STF/LTF symbols appear on a set of resource-units, a set of 20 MHz sub-channels, or the entire bandwidth of the PPDU by the AP's decision. A STA that receives such PPDU becomes aware of the presence of the additional HE STF/LTF symbols from one or multiple sub-fields within the first HE SIG-A or SIG-B symbols in the header (e.g., 501) and also becomes aware that its payload (e.g., 506), if there is any, appears after which of the HE STF/LTF symbol(s). In this embodiment, in order to add another PSDU to the end of a first PSDU, the AP first adds HE STF and/or HE LTF (right after the end of the first PSDU in the sub-band) and then adds the PSDU that is destined to another STA. For instance in FIG. 7, the PSDU destined to STA1 (e.g., 507) is followed by another payload to another STA (e.g., a payload to STA5 as in the figure) in the same sub-band that is assigned to STA1. In order to do this, the AP adds HE STF and/or HE LTF(s) symbols after the first PSDU and then adds the PSDU for STA5 (which may be sometimes referred to as a "subsequent PSDU", or a "PSDU in the second time-segment"). Similarly, in the same sub-band that the AP has assigned to STA3 (e.g., 510), the AP adds HE STF and/or HE LTF (e.g., 703) and a PSDU (e.g., 704) intended for STAG. However, in the same sub-band that the AP has assigned to STA4 (e.g., 512), the AP may not be able to add another PSDU for another STA and may resort to moderate padding (e.g., 513) of the PSDU to STA4. Note that the HE LTF may have multiple symbols depending on the number of spatial streams that each PSDU carries. In other embodiments, the AP may not add any HE STF/LTF if the subsequent PSDU is not beamformed. The necessary length information for each PSDU (e.g., the PSDU to STA1, STA2, STA3, STA4, STA5, STA6) and the particularly for PSDU to the subsequent PSDUs (e.g., STA5 and STA6) are indicated in HE SIG-A or HE SIG-B as described below. In another embodiment, a subsequent PSDU or a PSDU in the second time-segment is added to each sub-band or each resource-unit (RU). In another embodiment, a subsequent PSDU or a PSDU in the second time-segment is added to each 20 MHz sub-channel or to each sub-band or RU such that the time position of HE STF/LTF symbols at the beginning of each subsequent PSDU is aligned with the time position of HE STF/LTF symbols at the beginning of other subsequent PSDUs. This would mean that the length of each first PSDU in each 20 MHz sub-channel or sub-band is the same as the length of other first PSDUs in other 20 MHz sub-channels or sub-bands. In another embodiment, another subsequent PSDU or a PSDU in the next time-segment is added to each 20 MHz sub-channel or sub-band such that the time position of HE STF/LTF symbols at the beginning of each of such subsequent PSDUs is aligned with the time position of HE STF/LTF symbols at the beginning of other such subsequent PSDUs. In the above embodiments, where each 20 MHz sub-channel or sub-band that has one or more subsequent PSDUs, and wherever the additional HE STF symbols are aligned across the full bandwidth, the number of HE STF and HE LTF symbols whose beginning are aligned, are the same across 20 MHz sub-channels or sub-bands, and the type of such HE LTF symbols (such as the length of each HE LTF symbol), are the same across 20 MHz sub-channel or sub-bands (i.e. they are all 1×LTF, 2×LTF or 4×LTF).

In an embodiment, where each 20 MHz sub-channel carries one or more additional HE STF/LTF symbols, and where each additional HE STF/LTF symbol in each 20 MHz sub-channel is aligned across the full bandwidth, the partitioning of bandwidth to the resource-units between two consecutive HE STF/LTF symbols may vary such that the resource-units after an additional HE STF/LTF may not be the same with the partitioning of the resource-units before the additional HE STF/LTF. A STA that receives such PPDU becomes aware of the presence of the additional HE STF/ LTF symbols and the resource-unit partitioning between a consecutive pair of HE STF/LTF symbols from one or multiple sub-fields within the first HE SIG-A or SIG-B symbols in 501. In an embodiment, one or more fields within HE SIG-A/SIG-B indicate the presence, number, and/or location of the additional HE STF/LTF symbols or may include the number and duration of the time-segments, where each time-segment appears between two consecutive HE STF/LTF symbols. In an embodiment, there are multiple portions within HE SIG-B where each portion indicates the resource-unit partitioning between two consecutive HE STF/LTF symbols (i.e., the resource-units for a time-segment). In an embodiment, the Common field and the User Specific field of one time-segment appear together and possibly followed by the Common field and the User Specific field of a subsequent time-segment. In an embodiment, the Common field of one time-segment includes the duration or length of the same time-segment and may include an indication of whether there is a subsequent time-segment and possibly the length of a subsequent time-segment. In an embodiment, the cyclic-prefix (CP) or guard-interval (GI) in one time-segment may be different with the CP or GI in another time-segment within the same PPDU. In an embodiment, the number of HE STF and HE LTF symbols at the beginning of a time-segment may be different from the number of HE STF and HE LTF symbols at the beginning of another time-segment within the same PPDU. In an embodiment, the type of HE LTF symbols (such as the length of each HE LTF symbol) at the beginning of a time-segment may be different from the type of HE LTF symbols at the beginning of another time-segment within the same PPDU.

In one or more aspects, the HE STF and HE LTF symbols that fall between two consecutive PSDUs (such as the HE STF/LTF symbols between the PSDU for STA1 and PSDU for STA5), the total length of the HE STF and HE LTF symbols may be an integer multiple of the sum of the length of the OFDM symbol in the payload part (e.g., 506) of the DL OFDMA PPDU 700 plus the associated GI. For instance, if the OFDM symbols for the payload part of the DL OFDMA PPDU uses FFT=256 and the length of the OFDM symbol plus the GI is 16 μs, then the total length of the HE STF and HE LTF symbols may be an integer multiple of 16 μs. For instance, let's consider the case where HE STF duration is 4 μs and HE LTF duration is 8 μs and the GI for the payload section of the DL OFDMA PPDU is 3.2 μs (hence total duration of OFDM symbols with FFT=256 is 12.8+3.2=16 μs). Then, if the payload for STA5 or STA6 in FIG. 7 has NSS=1, e.g., a single spatial-stream, then one possibility for the total length of the HE STF/LTF symbols right before the start of the payload of STA5 and STA6 is to repeat HE STF symbol twice followed by an HE LTF symbol, which in total the length of (STF, STF, LTF) is 16 μs. For other GI values and for larger number of spatial streams there are more possibilities depending on implementation.

However, for the embodiments based on FIG. 7, the presence of HE STF and/or HE LTF depends on whether the subsequent PSDU is beamformed or not, and how many spatial streams are carried in the subsequent PSDU. For instance, if the subsequent PSDUs, such as the PSDU for STA5 and STA6 in FIG. 7, has NSS=1 and (and none of the PSDUs in the sub-band are beamformed to their respective STA, e.g., the TX-VECTOR BEAMFORMED parameter indicates no beamforming), then the AP can place the subsequent PSDU without any HE STF or HE LTF symbols.

This may be due to the fact that since HE STF and HE LTF symbols are usually beamformed and if the PSDU is not beamformed, hence the receiving STA can use earlier STF and LTF symbols (such as Legacy STF or LTF symbols or the HE STF/LTF symbols at the beginning of the PPDU) to adjust the PHY operation parameters in order to optimally receive its PSDU. The presence of HE STF and HE LTF for the subsequent PSDUs (e.g., the HE STF/LTF in between two PSDUs as shown in FIG. 7) may implicitly be obtained from the RX-VECTOR BEAMFORMED parameter, where when it indicated no beamforming, the receiver knows that the subsequent PSDU does not start with any HE STF/LTF symbols. In some embodiments, even if the subsequent PSDUs are not beamformed (e.g., the TX-VECTOR BEAM-FORMED parameter indicates no beamforming), a HE LTF symbol may be present to obtain a more precise and a fresher channel estimation for decoding the subsequent PSDU.

In some aspects, the STAs that have their PSDUs starting in the middle of the payload section of DL OFDMA PPDU (such as STA5 in FIG. 7), need not decode all the OFDM symbols that come before the start of their PSDU. The following explains the method to save power consumption by fast-forwarding to the beginning of their desired PSDU or time-segment. As described below, whether a subsequent PSDU or time-segment exists in a sub-band, and to which STA the subsequent PSDU or time-segment belongs to, and the start of each subsequent PSDU or time-segment (or the start of HE STF/LTF that comes before a subsequent PSDU or time-segment) are indicated in HE SIG-B or HE SIG-A fields. Hence, the STA that has a subsequent PSDU, or has a payload in a subsequent time-segment, knows from what OFDM symbol the PSDU (or HE STF/LTF symbols right before the PSDU) starts. Hence, the STA can skip to the start of the PSDU by avoiding PHY baseband processing of the OFDM symbols that do not have any assignment or payload for the STA. This may be performed by skipping the received signal in time-domain (e.g., not performing FFT processing) for the duration that is equivalent to the duration of the PSDU that has appeared before the assigned PSDU or the right time-segment. For instance, in reference to FIG. 7, STAs whose PSDU appears as a subsequent PSDU (after the PSDU of STA1) need not perform full PHY processing for all the received OFDM symbols. Alternatively, STAs can skip processing during the duration indicated by Tskip STA5 (e.g., simply skip processing these OFDM symbols in the time domain, without performing any FFT processing or the subsequent processing), where STA5 can start full PHY processing right at the beginning its assigned PSDU or right from HE STF/LTF symbols that come right before its PSDU. Similarly, STA6 whose PSDU appears as a subsequent PSDU (after the PSDU of STA3) need not perform full PHY processing for all the received OFDM symbols. Alternatively, STA6 can skip processing during the duration indicated by Tskip STA6 (e.g., simply skip processing these OFDM symbols in time domain, without performing any FFT processing or the subsequent processing), where STA6 can start full PHY processing right at the beginning its assigned PSDU or right from HE STF/LTF symbols that come right before its PSDU. Such technique offers power saving advantages to the STAs where their PSDU appear as subsequent PSDU.

In some implementations, there may be more than two PSDUs in a sub-band, and based on the explanation above, there may be a set of HE STF and/or HE LTF for each PSDU. As shown in FIG. 7, at most two PSDUs exist per sub-band. In one aspect, multiple PSDUs can exist in a sub-band, where each subsequent PSDU may start with HE STF and/or HE LTF symbols depending on NSS and whether TXVECTOR BEAMFORMED parameter indicates beamforming for the PSDU. The presence of HE STF/LTF symbols for each subsequent PSDU depends on the value of NSS, and whether TXVECTOR BEAMFORMED parameter indicates beamforming or not. It may be possible that the first subsequent PSDU has NSS=1 and it is not beamformed, hence does not have any HE STF/LTF symbols. But the second subsequent PSDU is either beamformed or has NSS>1, hence starts with HE STF and/or HE LTF symbols. Also, it is possible that the first subsequent PSDU has NSS>1 or it is beamformed, hence it has HE STF and/or HE LTF symbols, but the second subsequent PSDU NSS=1 and it is not beamformed.

In some aspects, the start of non-subsequent PSDUs, such as the PSDUs for STA1, STA2, STA3 and STA4 is known to be right after the PHY header (e.g., right after HE SIG-B or HE LTF symbols). Since this is implicitly given, the start of the non-subsequent PSDUs is not explicitly indicated. However, the beginning of the subsequent PSDUs (such as the PSDU destined to STA5 and STA6 in FIG. 7) may be indicated in HE SIG-A or HE SIG-B, along with other attributes of the PSDU (such as the identification of the STA that the PSDU belongs to and the PHY attributes of the PSDU). There are multiple ways to do so as explained below.

Figure 8:
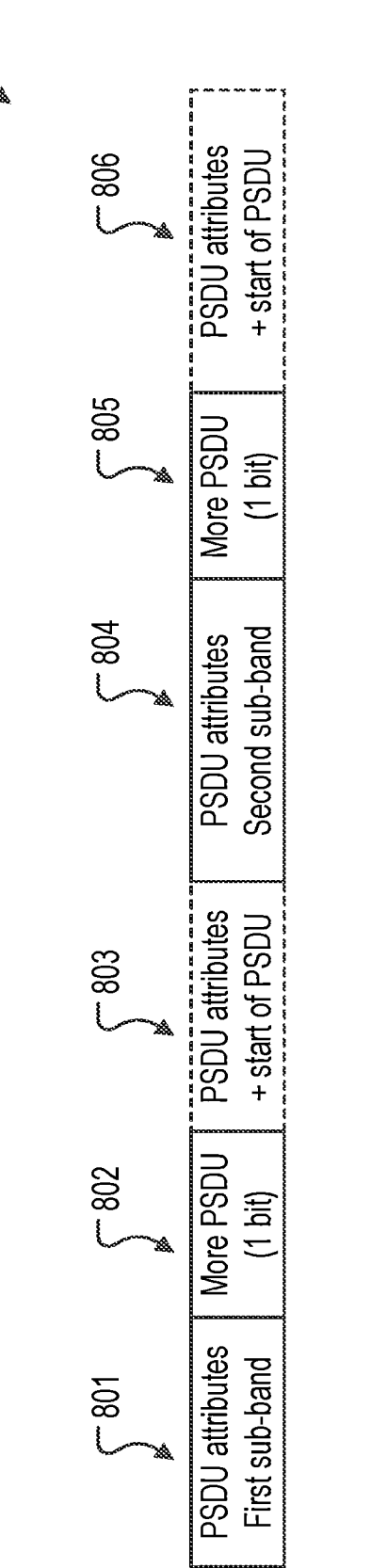
FIG. 8 illustrates a schematic diagram of an example of a sequence to indicate the presence and attributes of subsequent PLCP service data units (PSDU) s along with the PSDU attributes.

FIG. 8 illustrates a schematic diagram of an example of a sequence 800 to indicate the presence and attributes of subsequent PLCP service data units (PSDU) s along with the PSDU attributes. The "PSDU attributes" in FIG. 8 may be in a form of "SU PSDU attributes" or "MU PSDU attributes." For "MU PSDU attributes," a MUSU field (described below) may appear as a sub-field of "SU PSDU attributes" and "MU PSDU attributes." The sequence of data shown in FIG. 8 may appear in HE SIG-A or HE SIG-B symbols. In this embodiment, the attributes of all the PSDUs appear in the order of increasing index of the sub-bands. For instance the first "SU PSDU attributes" indicates the attributes of the first sub-band (e.g., 801), and the second "SU PSDU attributes" indicates the attributes of the second sub-band (e.g., 803), and the last "SU PSDU attributes" indicates the attributes of the last sub-band. As shown in FIG. 8, after each PSDU attribute, there is a single-bit field which is called "More PSDU" field (e.g., 802, 805) and it simply states whether there is a subsequent PSDU in the same sub-band or not. If the "More PSDU" field is equal to zero, it means there is no subsequent PSDU in the sub-band, and if the "More PSDU" field is equal to one, it means there is a subsequent PSDU in the sub-band, which follows with the "SU PSDU attributes" and the start of the PSDU (e.g., 803, 806). In other another embodiment, if the "More PSDU" field is equal to one, it means there is a subsequent PSDU in the sub-band, which follows with the "SU PSDU attributes", the start of the PSDU, and another single-bit "More PSDU" field. The value of this "More PSDU" may be zero or one, and if it is one it indicates that there is a second subsequent PSDU in the sub-band and then another "SU PSDU attributes", the start of PSDU, and another "More PSDU" field follows. In other embodiments, the "More PSDU" field (e.g., 802, 805) may appear as a sub-field in "SU PSDU attributes" as well as "MU PSDU attributes" (which will be explained later), and would have the same meaning as explained above. In an alternative embodiment, where there is always one or more subsequent PSDUs or subsequent time-segments in each sub-band or resource-unit (RU), and each duration of a specific time-segment (i.e. first time-segment, second time-segment, etc.) is the same across all sub-bands or RUs, the set of PSDU attributes of the next time-segment appears after the set of PSDU attributes of the previous time-segment, along with a time-reference to the beginning of each next time-segment. For instance, if there are two time-segments, where the size of the first time-segment is the same across all RUs and the size of the second time-segment is the same across all RUs, then in HE SIG-A or SIG-B, the set of the PSDU attributes of the second time-segment appears after the set of the PSDU attributes of the first time-segment, as well as a time-reference to the beginning of the second time-segment (e.g. in form of the number of OFDMA symbols).

The "SU PSDU attributes" field contains several sub-fields such as: MCS (4 bits), AID (12 bits), Coding (1 bit), NSTS (3 bits), STBC (1 bit), SU-Beamformed (1 bit). In other embodiments, instead of AID, Partial AID (PAID) may be used. While the order of the sub-fields is not crucial, appearing the MCS sub-field as the first sub-field in the "SU PSDU attributes" would be beneficial as described below. The value for Coding is BCC or LDPC. The values for NSTS (or NSS) is zero to seven, which indicates the number of spatial streams. The field of AID (which is an association identifier) is an identification that is assigned to a STA by the AP at the time of association. The values for MCS range from zero to nine based on the number of MCS defined in IEEE 802.11ac and other values are reserved. However, in subsequent specifications of IEEE 802.11 values larger than nine may be used for newly introduced MCS. In an embodiment, the value of MCS=15 is used to indicate a special meaning as described below. The field "start of PSDU" (e.g., 803, 806) indicates the OFDM symbol index where a subsequent PSDU starts. The indexing of the OFDM symbols start right after the PHY header, e.g., right after the last symbol of the HE PHY header (which may be HE SIG-B or HE LTF symbols). The index of the first OFDM symbol after the HE PHY header symbols is set to zero, and the index of the next OFDM symbols increments by one. The size of "start of PSDU" field may be eight bits.

Figure 9:
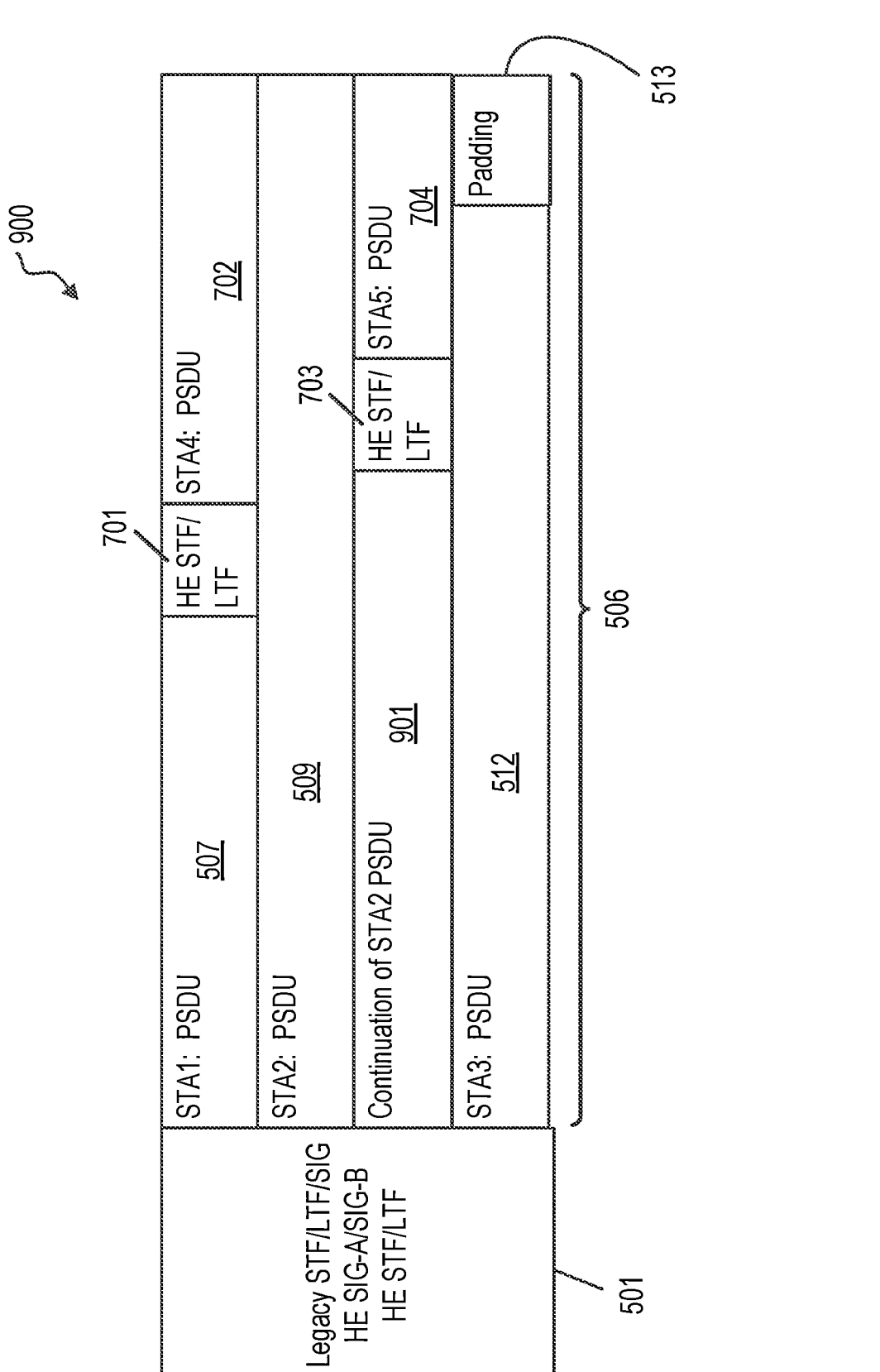
FIG. 9 illustrates an example of a DL OFDMA PPDU transmission to a set of STAs.

FIG. 9 illustrates an example of a DL OFDMA PPDU 900 transmission to a set of STAs. FIG. 9 shows a transmission as in FIG. 7, except that the PSDU for STA2 continues to a separate sub-band shared by STA5. In this respect, two or more consecutive sub-bands are assigned to a single PSDU (e.g., the PSDU for STA2 covers more than one sub-band). As the example shown in FIG. 9, where the assignment for STA2 covers two consecutive sub-bands (e.g., 509, 901), the "SU PSDU attributes" for the second sub-band appears in a shorter form. As indicated above, the "SU PSDU attributes" start with the field MCS. If the value of MCS is set to 15, it indicates that the same "SU PSDU attributes" as the previous sub-band is being applied, and the remaining sub-fields of the "SU PSDU attributes" are skipped. For instance in the example of FIG. 9, the sequence of "SU PSDU attributes" are as follows: "SU PSDU attributes"{MCS, STA1's AID, . . . }+{More PSDU=1}+"SU PSDU attributes"{MCS, STA4's AID, . . . }+{start of PSDU: STALE}+"SU PSDU attributes"{MCS, STA2's AID, . . . }+{More PSDU=0}+ "SU PSDU attributes"{MCS=15}+{More PSDU=1}+"SU PSDU attributes"{MCS, STA5's AID, . . . }+{start of PSDU: STA5}+"SU PSDU attributes"{MCS, STA3's AID, . . . }+{More PSDU=0}. If more than two consecutive sub-bands are used for a single PSDU, then for the first sub-band all the sub-fields of the "SU PSDU attributes" appear, and for the second sub-band only the MCS sub-field appears with value equal to 15, and for the third sub-band only the MCS sub-field appears with value equal to 15, and so on until the last sub-band. Note that instead of the value of 15, other values from 9 to 14 may be used, or any other value that does not convey any MCS index.

Figure 10:
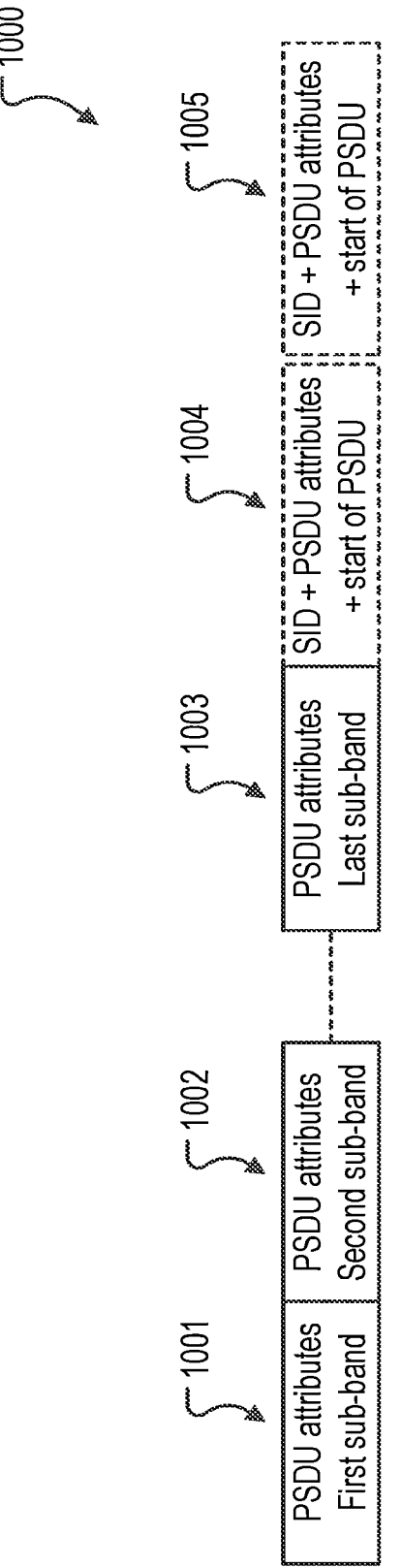
FIG. 10 illustrates a schematic diagram of an example of a sequence to indicate the presence and attributes of subsequent PSDUs along with the PSDU attributes.

FIG. 10 illustrates a schematic diagram of an example of a sequence 1000 to indicate the presence and attributes of subsequent PSDUs along with the PSDU attributes. In one aspect, the sequence 1000 may indicate presence of subsequent PSDUs in a sub-band(s) along with the PSDU attributes. The "PSDU attributes" shown in FIG. 10 may be in a form of "SU PSDU attributes" or "MU PSDU attributes." In case of "MU PSDU attributes," a MUSU field (described below with respect to FIG. 12) may appear as a sub-field of "SU PSDU attributes" and "MU PSDU attributes." The sequence 1000 of data shown in FIG. 10 may appear in the HE SIG-A or HE SIG-B symbols. In this embodiment, the attributes of all the PSDUs appear in the order of increasing index of the sub-bands. For instance the first "SU PSDU attributes" 1001 indicates the attributes of the first sub-band, and the second "SU PSDU attributes" 1002 indicates the attributes of the second sub-band, and the last "SU PSDU attributes" 1003 indicates the attributes of the last sub-band. As shown in FIG. 10, the PSDU attribute for all the sub-bands appear in order. If two or more consecutive sub-bands are used for a single PSDU then value of MCS=15 is used to indicate that the PHY attributes of the two or more sub-bands are the same (and the remaining sub-fields of the "SU PSDU attributes" that starts with MCS=15 is skipped as explained above). After the "SU PSDU attributes" for all the sub-bands that appear in order, the "SU PSDU attributes" for the subsequent PSDUs are indicated. To do so, the "SU PSDU attributes" appear along with Sub-band ID (SID) and "start of PSDU" (e.g., 1004, 1005). The value and meaning of "start of PSDU" is as explained above. The sub-field SID is an index of the sub-bands (that have a subsequent PSDU). The number of bits assigned to SID depends on the number of sub-bands in the PPDU. For instance, if the PPDU bandwidth is 20 MHz, and the bandwidth of each sub-band is 5 MHZ, then SID has two bits. If the PPDU bandwidth is 40 MHz or 80 MHZ, and the bandwidth of each sub-band is 5 MHz, then SID has three or four bits. If the PPDU bandwidth is 20 MHz or 40 MHz or 80 MHz, and the bandwidth of each sub-band is 2.5 MHz, then SID has three, four or five bits subsequently. In an alternative embodiment, where there is always one or more subsequent PSDUs or subsequent time-segments in each sub-band or RU, and the duration of a specific time-segment is the same across all RUs, the set of PSDU attributes of the next time-segment appears after the set of PSDU attributes of the previous time-segment, as shown in FIG. 10 but without SID indication (since all RUs have a subsequent PSDU) and where "start of PSDU" appears only once in the sequence as a time-reference to the beginning of each next time-segment. For instance, if there are two time-segments, the sequence in FIG. 10 would be the set of PSDU attributes of the first time-segment follows by the set of PSDU attributes of the second time-segment, along with a "start of PSDU" subfield that is the time-reference to the beginning of each second time-segment.

Figure 11:
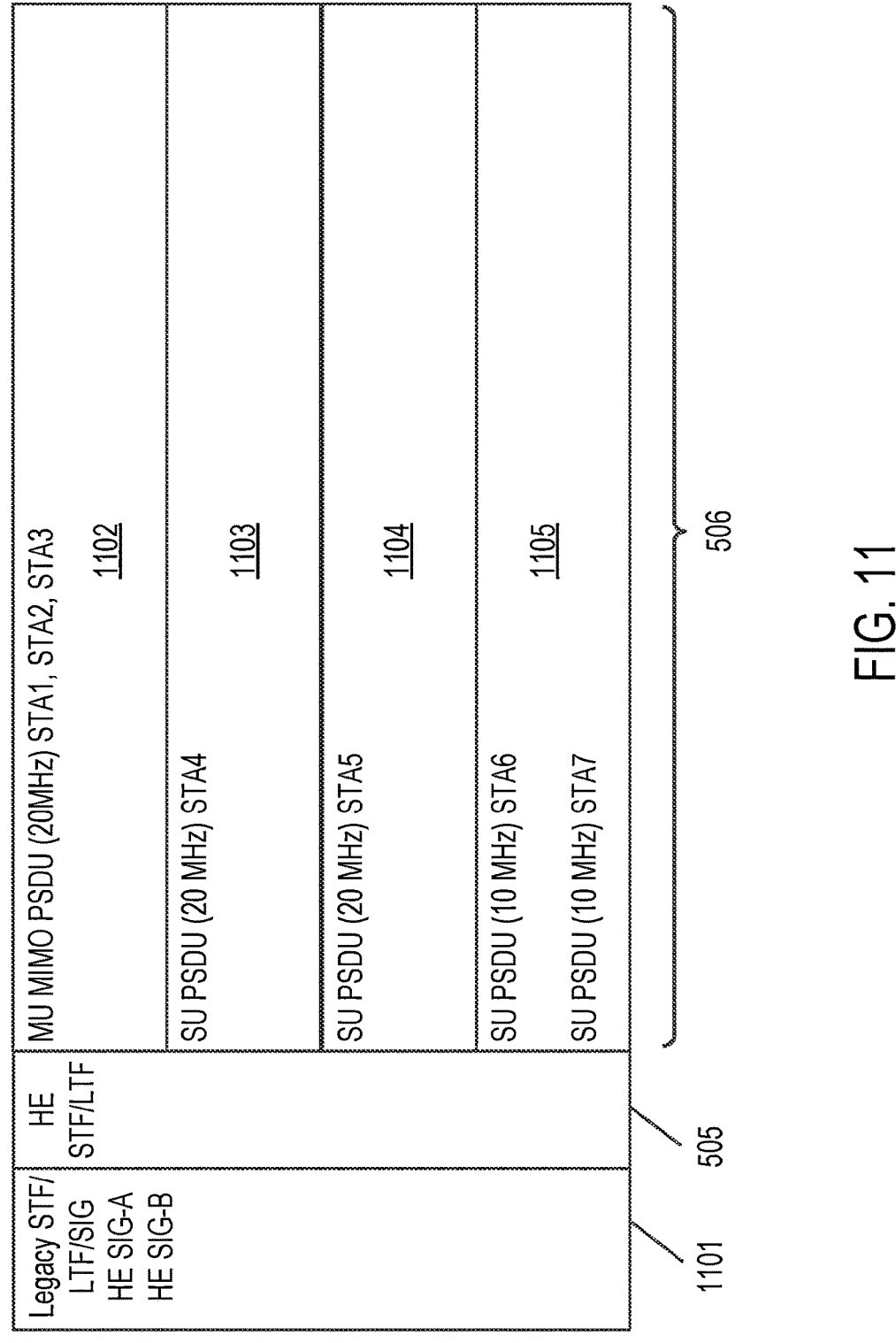
FIG. 11 illustrates an example of a DL OFDMA PPDU transmission to a set of STAs.

FIG. 11 illustrates an example of a DL OFDMA PPDU 1100 transmission to a set of STAs. FIG. 11 shows that if the AP has DL MU MIMO capability, the AP may use one of several sub-bands to perform DL MU MIMO transmissions to the STAs that are DL MU MIMO capable and use the remaining of the sub-bands to other STAs for a non DL MU MIMO transmission (or non-MU-MIMO transmission). In this embodiment, the bandwidth of individual sub-bands are not the same (e.g., 1103, 1104, 1105), and a DL MU MIMO technique has been used in the top 20 MHz sub-band to send individual PSDUs within the same 20 MHz bandwidth to STA1, STA2, and STA3 (e.g., 1102). To uniquely indicate and address SU and MU transmissions within a DL OFDMA PPDU, the following methods are described.

In the first solution to uniquely indicate and address SU and MU transmissions within a DL OFDMA PPDU, a new field called MU Sub-band is used where SID and GID (Group ID as in IEEE 802.11ac GID) are used. The pair of (SID, GID) indicates the GID that a sub-band is using. Note that a given GID value, such as GID=0, is used to indicate SU transmission, e.g., no DL MU MIMO transmission. However, other GID values indicate DL MU MIMO transmission to the STAs that are a member of the given GID. The membership of each GID is pre-announced by AP. For instance, if the PPDU bandwidth is 20 MHz, and the bandwidth of each sub-band is 5 MHz, then SID has two bits and above-mentioned sequence appears as: (00,GID0), (01, GID1), (10,GID2), (11,GID3), where GID0, GID1, GID2, and GID3 are values for GID and may be zero to indicate SU transmission, or may be other values to indicate DL MU MIMO transmission to a set of STAs. The above sequence may appear in HE SIG-A or HE SIG-B (e.g., 1101).

Moreover, in case that none of the sub-bands have DL MU MIMO transmission, a single field is defined (denoted by SIDMU) that indicates whether there is any DL MU MIMO transmission, in which case the above sequence follows, or indicates that there is no DL MU MIMO transmission, in which case there is no need that the above sequence follows since all the GID values would indicate SU transmission (e.g., GID=0). Therefore, the following sequence of fields is provided: {SIDMU}+(SID0,GID0)+(SID1,GID1)+(SID2, GID2)+ . . . . If SIDMU=0 (e.g., no MU transmission) then the sequence of (SID,GID) does not follow, and SIDMU=1 then the sequence of (SID,GID) follows, e.g., {SIDMU=1}+ (SID0,GID0)+(SID1,GID1)+(SID2,GID2)+ . . . where some of GID values is zero (e.g., SU transmission) and some are non-zero indicating GID that two or more STAs are member of it. The above sequence only indicates the presence of DL MU MIMO transmission. Subsequently, in the same HE SIG-A or HE SIG-B (e.g., 1101), the sequence of "SU PSDU attributes" may appear. Note that in this embodiment, since both SU and MU MIMO transmissions are possible, the field of "PSDU attributes" is different for SU and MU MIMO. For the sequence of "PSDU attributes", both embodiments as in FIG. 8 and FIG. 10 can be used. In either of the embodiments, the "PSDU attributes" for SU case is the same as explained above, hence denoted as "SU PSDU attributes." However for those sub-bands that have MU MIMO transmissions their "PSDU attributes" is as follows (denoted by "MU PSDU attributes"): first GID (6 bits) appears, followed by NSTS (3 bits per each STA) for all the STAs that belong to the GID, followed by the following sub-fields only for those STAs that have non-zero NSTS: AID (12 bits per each STA), MCS (4 bits per each STA), Coding (1 bit per each STA), and Length (16-19 bits per each STA).

If two or more consecutive sub-bands are used for the same DL MU MIMO transmission, then for the second and subsequent sub-bands, the "MU PSDU attributes" starts with a given GID value, e.g., GID=62, which indicates that the "MU PSDU attributes" of the sub-band is the same as "MU PSDU attributes" of the previous sub-band. In this situation, the remaining sub-fields of "MU PSDU attributes" are skipped and not presented. As an example, the "MU PSDU attributes" for a DL MU MIMO transmission that appear on three consecutive sub-bands are: {GID, (NSTS, AID, MCS, Coding, Length) for each STA in the GID with non-zero NSTS}+{GID=62}+{GID=62}.

Note that instead of GID=62, GID=0 (or the same GID value that is used to indicate SU transmission) can be used that similarly may indicate the above meaning. While GID=0 is used for SU transmission, when GID=0 appears after a sub-band with a non-zero GID that indicates MU MIMO transmission, it unambiguously may indicate that the "MU PSDU attributes" of the sub-bands is the same as the "MU PSDU attributes" of the prior sub-band and the remaining sub-fields of "MU PSDU attributes" of that sub-band is skipped. The approach of reusing the GID value of SU leaves more GID values to be used for MU MIMO transmission.

In another embodiment, "MU PSDU attributes" may be represented as: NSTS (3 bits per each STA) for all the STAs that belong to the GID, followed by the following sub-fields only for those STAs that have non-zero NSTS: AID (12 bits per each STA), MCS (4 bits per each STA), Coding (1 bit per each STA), and Length (16-19 bits per each STA).

In one embodiment, the length of HE SIG-B associated with MU MIMO transmission is shorter than the length of HE SIG-B associated with the SU MIMO transmission.

Figure 12:
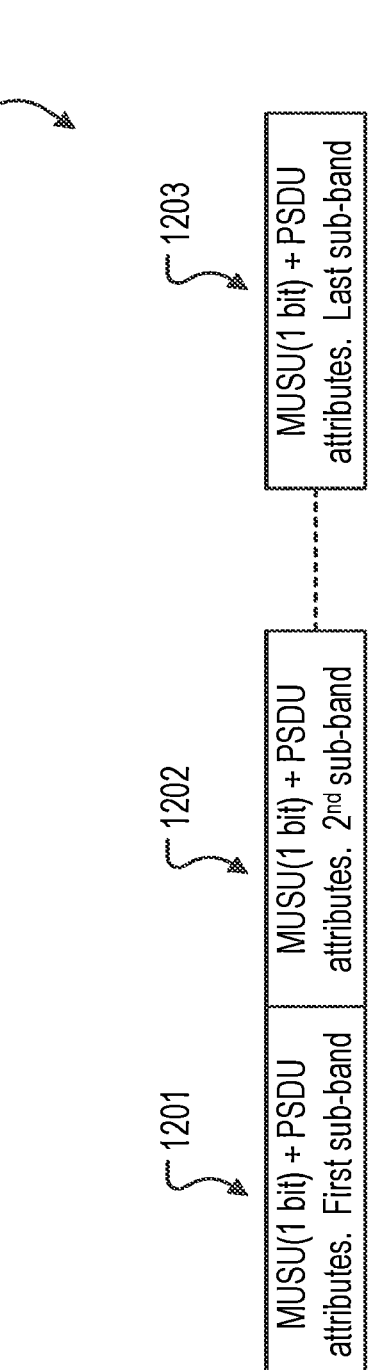
FIG. 12 illustrates a schematic diagram of an example of a sequence to indicate the presence of sub-bands with several PSDU attributes.

FIG. 12 illustrates a schematic diagram of an example of a sequence 1200 to indicate the presence of sub-bands with several PSDU attributes (e.g., 1201, 1202, 1203). In one aspect, the sequence 1200 may indicate presence of sub-bands with DL MU MIMO PSDUs in a sub-band(s) along with the PSDU attributes. The "PSDU attributes" shown in FIG. 12 may be in a form of "SU PSDU attributes" or "MU PSDU attributes." In one or more aspects, a MUSU field may appear as a sub-field of "SU PSDU attributes" and "MU PSDU attributes." In one aspect, FIG. 12 illustrates a second solution to uniquely indicate and address SU and MU transmissions within a DL MU MIMO or OFDMA PPDU.

In FIG. 12, for each sub-band, a single-bit field denoted by MUSU is used where MUSU=0 indicates SU transmission (indicating OFDMA transmission), and MUSU=1 indicates MU MIMO transmission. Then the PSDU attributes are as follows:

If MUSU=0, the "SU PSDU attributes" follow as described in the embodiments related to FIG. 8 and FIG. 10. For instance, in FIG. 11, the MUSU subfield for each 20 MHz sub-channel 1103, 1004 and 1105 is set to zero since they are not MU-MIMO. With such indication, one or more "SU PSDU attributes" follow depending on the number of assignments in each 20 MHz sub-channel.

If MUSU=1, the "MU PSDU attributes" follow as described above. For instance, in FIG. 11, the MUSU subfield for the top 20 MHz sub-channel 1102 is set to one since it is MU-MIMO. With such indication, two or more "MU PSDU attributes" follow depending on the number of STAs that have assignments in the top 20 MHz sub-channel (in the example of FIG. 11, three "MU PSDU attributes" follow).

If two or more sub-bands are used for a PSDU for a STA, then the value of MCS=15 is used to indicate that the "SU PSDU attributes" of the second (e.g., 1202) and next sub-bands (e.g., 1203) is the same as the "SU PSDU attributes" of the prior sub-band (e.g., 1201) and the remaining sub-fields of "SU PSDU attributes" of that sub-band is skipped and not presented (similar to the description given for the embodiments related to FIG. 8 and FIG. 10).

If two or more sub-bands are used for a DL MU MIMO transmission, then the value of GID=62 is used to indicate that the "MU PSDU attributes" of the second (e.g., 1202) and next sub-bands (e.g., 1203) is the same as the "MU PSDU attributes" of the prior sub-band (e.g., 1201) and the remaining sub-fields of "MU PSDU attributes" of that sub-band is skipped and not presented (similar to the description given above).

Note that instead of GID=62, GID=0 (or the same GID value that is used to indicate SU transmission) can be used that similarly may indicate above meaning. While GID=0 is used for SU transmission, when GID=0 appears after a sub-band with a non-zero GID that indicates MU MIMO transmission, it unambiguously may indicate that the "MU PSDU attributes" of the sub-bands is the same as the "MU PSDU attributes" of the prior sub-band and the remaining sub-fields of "MU PSDU attributes" of that sub-band is skipped. The approach of reusing the GID value of SU leaves more GID values to be used for MU MIMO transmission.

In some embodiments, to uniquely indicate and address SU and MU transmissions within a DL MU PPDU, the MUSU subfield discussed above appears in HE SIG-A symbol (e.g., 405, 1101). As indicated above, the MUSU subfield may be a single-bit subfield where it indicates whether a given resource unit (RU) carries MU-MIMO PSDUs or SU PSDU. In one example, as shown in FIG. 12, the MUSU subfield are specific to RUs with bandwidth 20 MHz. The MUSU subfield may indicate whether RUs with bandwidth 20 MHz, 40 MHz, 80 MHz and 160 MHz carry MU-MIMO PSDUs. In one aspect, each of 20 MHz, 40 MHz, 80 MHz and 160 MHz is an example of a full bandwidth of a MU-MIMO transmission. In some embodiments, the MUSU subfield has multiple bits, where each bit is for one 20 MHz RU and indicates whether the associated 20 MHz sub-band carries MU-MIMO PSDUs or not. As an example, the MUSU subfield would have length 1, 2, 4, and 8 bits respectively for 20 MHz (MUSU=b0), 40 MHz (MUSU=b0,b1), 80 MHZ (MUSU=b0, . . . , b3) and 160 MHZ (MUSU=b0, . . . , b7), where each bit indicates whether the corresponding 20 MHz RU has MU-MIMO PSDUs (MU-MIMO assignments) or SU PSDUs. When the corresponding bit is set to a TRUE value, it would indicate that the 20 MHz sub-channel (or equivalently the 20 MHz RU) carries MU-MIMO PSDUs, otherwise it would indicate that the PSDUs within the corresponding 20 MHz sub-channel are SU PSDUs (i.e. one or more SU PSDUs are assigned to narrower RUs within the 20 MHz sub-channel). In some embodiments, the above technique is used to indicate whether a 40 MHz RU has MU-MIMO (applicable to PPDUs with 40 MHz or larger bandwidth). As an example, the MUSU subfield would have length 1, 2, and 3 bits respectively for 40 MHZ (MUSU=b0), 80 MHZ (MUSU=b0,b1) and 160 MHZ (MUSU=b0, . . . , b3), where each bit indicates whether the corresponding 40 MHZ RU has MU-MIMO PSDUs (MU-MIMO assignments) or SU PSDUs. In another embodiment, additional bits are added to MUSU subfield such that it would indicate whether each bit indicates a 20 MHz RU or a 40 MHz RU. For instance, one bit (such as a prefix bit p0) would indicate whether the MU-MIMO RUs is 20 MHz or 40 MHz where p0=0 indicates the RUs are 20 Mhz hence the MUSU is interpreted as above, and p0=1 indicates the RUs are 40 Mhz hence the MUSU would have length 1, 2 and 4 and as 40 MHZ (MUSU=p0, b0), 80 MHZ (MUSU=p0, b0, b1), 160 MHZ (MUSU=p0, b0, . . . , b3). In another instance, two bits (such as prefix bits p0,p1) would indicate whether the MU-MIMO RUs is 20 MHZ (p0,p1=00), 40 MHZ (p0, p1=01), or 80 MHZ (p0,p1=10).

The fields and subfields described in the above embodiments appear as a TXVECTOR parameter between MAC and PHY sub-layers in a transmitting STA (see FIG. 2). The fields and subfields described in the above embodiments appear as a RXVECTOR parameter between MAC and PHY sub-layers in a receiving STA (see FIG. 2). Specifically, the "More PSDU" field described above would be a TXVEC-TOR parameter that is optionally present for each sub-band that has multiple PSDUs in a sub-band as shown in the example of FIG. 7. When "More PSDU" field is equal to one for a sub-band, the PHY sub-layer of the transmitting STA adds HE STF and/or HE LTF symbols before the subsequent PSDU as described above.

The capability to aggregate multiple PSDUs in a single sub-band may be limited to some AP or STAs, hence some capability fields are described below to indicate such capability. In HE Capabilities, a subfield denoted by TXMulti-PSDUCapability (1 bit) indicates whether an AP is capable of aggregating multiple PSDUs in a single sub-band (similar to the example in FIG. 7). If an AP is capable of aggregating multiple PSDUs in a single sub-band it sets TXMultiPSDU-Capability=1, otherwise it sets it to TXMultiPSDUCapability=0. In another embodiment, TXMultiPSDUCapability may have multiple bits, e.g., TXMultiPSDUCapability (2 bits) where it is encoded as follows: If an AP is not capable of aggregating multiple PSDUs in a single sub-band it sets TXMultiPSDUCapability=0, and if it is capable of aggregating up to two PSDUs in a single sub-band it sets TXMultiPSDUCapability=1, and if it is capable of aggregating up to three PSDUs in a single sub-band it sets TXMultiPSDUCapability=2, and if it is capable of aggregating up to four PSDUs in a single sub-band it sets TXMultiPSDUCapability=3.

In HE Capabilities, a subfield denoted by RXMultiPSDU-Capability (1 bit) indicates whether a STA is capable of aggregating multiple PSDUs in a single sub-band (similar to the example in FIG. 7). If a STA is capable of receiving multiple aggregated PSDUs in a single sub-band it sets RXMultiPSDUCapability=1, otherwise it sets it to RXMul-tiPSDUCapability=0. In another embodiment, RXMultiP-SDUCapability may have multiple bits, e.g., RXMultiP-SDUCapability (2 bits), where it is encoded as follows: If a STA is not capable of aggregating multiple PSDUs in a single sub-band it sets RXMultiPSDUCapability=0, and if it is capable of receiving up to two aggregated PSDUs in a single sub-band, it sets RXMultiPSDUCapability=1, and if it is capable of receiving up to three aggregated PSDUs in a single sub-band, it sets RXMultiPSDUCapability=2, and if it is capable of receiving up to four aggregated PSDUs in a single sub-band, it sets TXMultiPSDUCapability=3.

The capability to support DL MU MIMO in an OFDMA sub-band may be limited to some AP or STAs, hence some capability fields are described below to indicate such capability. In HE Capabilities, a subfield denoted by TXMU-OFDMACapability (1 bit) indicates whether an AP is capable of support DL MU MIMO in an OFDMA sub-band (similar to the example in FIG. 11). If an AP is capable of supporting DL MU MIMO in an OFDMA sub-band, it sets TXMUOFDMACapability=1, otherwise it sets it to TXMU-OFDMACapability=0. If TXMUOFDMACapability=1, other capabilities of DL MU MIMO transmission within HE Capabilities or VHT Capabilities applies. In HE Capabilities, a subfield denoted by RXMUOFDMACapability (1 bit) indicates whether a STA is capable of receiving DL MU MIMO in an OFDMA sub-band (similar to the example in FIG. 11). If a STA is capable of receiving DL MU MIMO in an OFDMA sub-band it sets RXMUOFDMACapability=1, otherwise it sets it to RXIVIUOFDMACapability=0. If RXMUOFDMACapability=1, other capabilities of DL MU MIMO reception within HE Capabilities or VHT Capabilities applies.

Referring back to FIG. 5, since there are different payloads in an IEEE 802.11ax/HE DL OFDMA (as in FIG. 5), they would have different lengths and both MAC padding and PHY padding may be necessary. This indicates that the actual length of each payload would be different. In order to offer power-saving advantages to the recipient of each payload, it may be best if the actual length of each payload is indicated so that the recipient, knowing the actual length, stops decoding and processing the padded parts.

Note that there may be more than four payloads multiplexed into a single OFDMA PPDU (unlike the example shown in FIG. 5). Hence, all the length values (per each payload) need to be explicitly carried. Note that these length values may be carried in either HE SIG-A or HE SIG-B symbols (e.g., 503, 504). In the following several methods for encoding all the lengths are described.

The first solution is to use differential coding to carry the length of each payload. First, the length indication would be in units of U bytes, e.g., U=4 bytes. A reference length is indicated for the longest payload or longest PSDU in absolute value and denote it by LO. LO may have 16 bits. Note that LO may be the length for the primary access category (AC) that has won the contention. Next for all other payloads, a differential method may be used to indicate their length. To do so, first denote the length for a shorter payload by Lx, and then the value of Dx=LO−Lx is carried is indicated in HE SIG-A/B. Since Dx is the difference between two payload lengths, and since it is expected that the AP is not multiplexing payloads with significantly different length, it is expected that Dx requires a smaller number of bits, e.g., 7 bits. Note that the max value for Dx (e.g., 128 if 7 bits is used to represent Dx), limits the MAC scheduler to multiplex the payloads whose size have at most 64×U=512 bytes difference. If 8 bits are assigned for Dx, then the max payloads difference would be 1024 bytes. This type of differential encoding requires 16+7×(nSTA−1) bits, e.g., if nSTA=4 it would require 37 bits.

Note that L LENGTH (that is obtained from the L-SIG symbol as shown in the example of FIG. 5) is used to calculate total number of symbols for longest payload (Nsym). Then the reception time is calculated via RXTIME=4×((L LENGTH+3)/3)+20 and finally Nsym=floor ((RXTIME−Legacy Header−RE Header)/Tsym), where Legacy Header is the total time duration of the legacy header (20 µs) and HE Header is the total time duration of the HE PHY header.

Figures 13A, 13B:
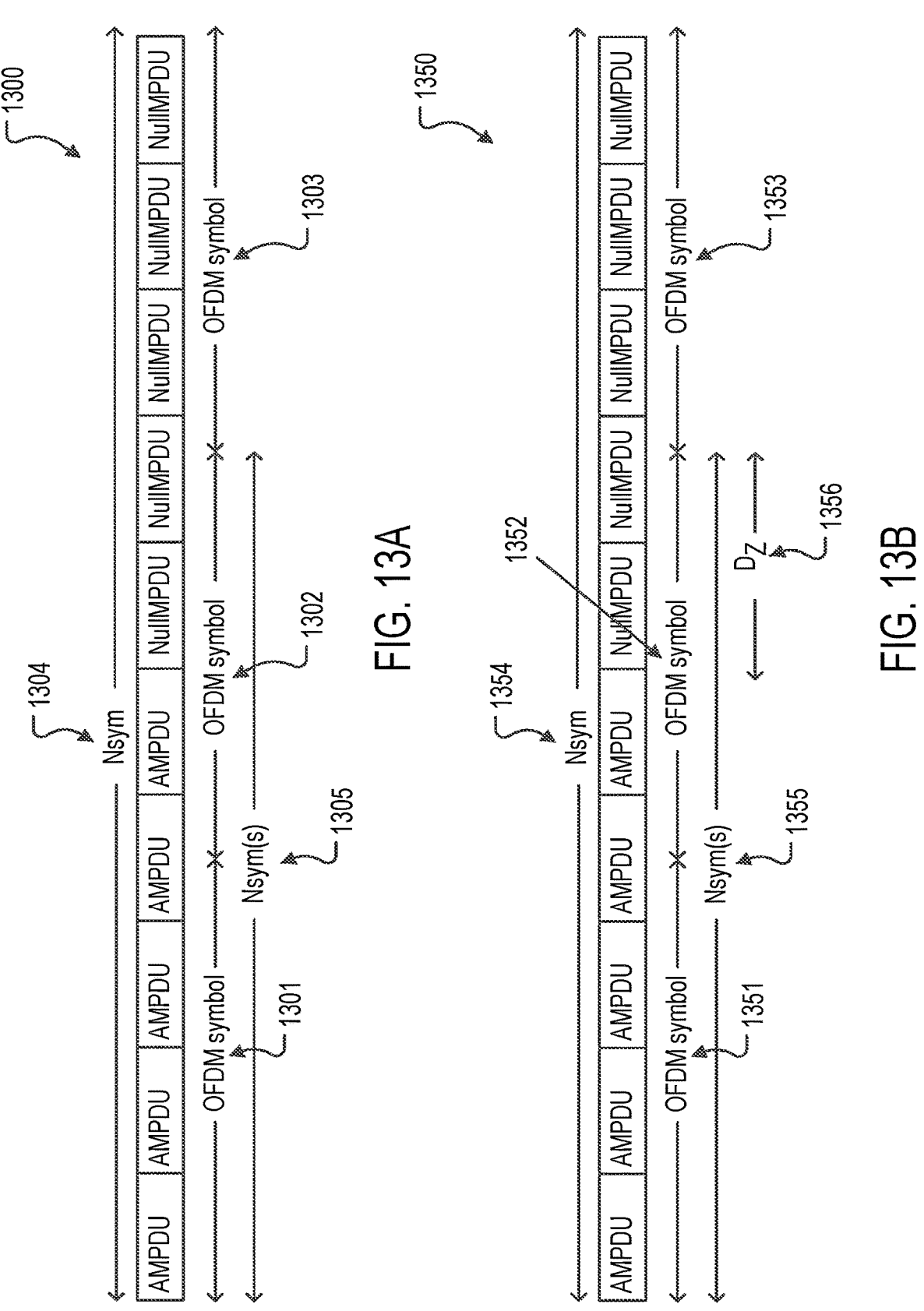
FIGS. 13A and 13B illustrate schematic diagrams of examples of differential encoding for length indication.

FIG. 13A illustrates a schematic diagram of an example of differential encoding for length indication. FIG. 13A shows a given payload 1300 which has been padded by Null-MPDUs (which are null MAC protocol data units) so that its length becomes about the same as the longest payload. The actual length of this payload is Nsym(s) (e.g., 1305). However, the length that is indicated in L-SIG is Nsym (which is the length of the longest payload). In the example shown in FIG. 13A, Ds=1 OFDM symbol (e.g., 1301, 1302, 1303), since Nsym (e.g., 1304) has the value of 3 while Nsym(s) (e.g., 1305) has the value of 2.

In FIG. 13A, which illustrates a second solution, differential encoding is used to encode the OFDM-symbol index. In this method, the length of the longest PSDU is obtained via L-SIG as described above. However, for each payload there would be a Dx, where unlike the first method (see FIG. 5), the value of Dx is reported as the difference in OFDM symbols for each payload. For instance, assume that the duration in number of OFDM symbols that is obtained from L-SIG as described above is denoted by Nsym (e.g., 1304), and then assume the actual length of this payload without any MAC padding (e.g., excluding the null PDUs) is Nsym (s) (e.g., 1305). Then in this solution, the difference between Nsym and Nsym(s), denoted by Ds=Nsym-Nsym(s), is encoded and carried in the HE SIG A/B of the DL OFDMA PPDU. Note that Nsym(s) is the number of OFDM symbols (e.g., 1301, 1302) for a given payload, excluding any overflow of a null 1VIPDU to the next symbol (e.g., 1303) as shown in FIG. 13A.

FIG. 13B illustrates a schematic diagram of another example of differential encoding for length indication. This third solution is based on differential encoding method for both length (in bytes) and duration (in number of OFDM symbols). FIG. 13B shows a given payload, which has been padded by Null-1VIPDUs so that its length becomes about the same as the longest payload. The actual length of this payload is Nsym(s) (e.g., 1355). However, the length that is indicated in L-SIG is Nsym (which is the length of the longest payload) (e.g., 1354). In addition to the value of Ds, the value of the Dz (e.g., 1356) is reported which is the total number of bytes (in units of U bytes) that are the padded values in the last OFDM symbol (whose content is not entirely null MPDU5) (e.g., 1352). In the example shown in FIG. 13B, Ds=1 OFDM symbol, since Nsym has the value of 3 while Nsym(s) has the value of 2, and Dz (e.g., 1356) has the length of a null MPDU (in units of U bytes).

The value of LO as described in the first solution above is carried in the HE SIG-B of the DL OFDMA PPDU. Then the value of L LENGTH from L-SIG symbol is used to calculate Nsym (e.g., 1354). Then for each payload (or each PSDU), two differential lengths are reported. First differential number of OFDM symbols as described in the second solution above (Ds=Nsym−Nsym(s)) is reported. Then the number of the padded bytes in the last OFDM symbol (e.g., 1352) (whose content is not entirely null MPDU) in units of U is reported, this value is denoted by Dz (e.g., 1356). Note that Dz may be rounded down in case byte boundaries (in units of U bytes) does not coincide with OFDM symbol boundary. Note that this method is good if AP MAC scheduler multiplexes payloads with large length differences. Compared to the second method (see FIG. 13A), this method allows the receiver to shut off the PHY processing at the beginning of MAC padding, while in the second method some of the MAC padding that happen to be in the last OFDM symbol (that is not entirely consists of Null MPDUs) may still be decoded by the receiver. The number of bits to represent Ds is small e.g., 1-3 bits. However, the receiver may still decode a few null MPDUs, but would avoid decoding OFDM symbols whose content (for the given recipient) is entirely null MPDUs (e.g., 1353).

The fields and subfields described in the above embodiments appear as a TXVECTOR parameter between MAC and PHY sub-layers in a transmitting STA (e.g., see FIG. 2). The fields and subfields described in above embodiments appear as a RXVECTOR parameter between MAC and PHY sub-layers in a receiving STA (e.g., see FIG. 2). Specifically, the length values described above, either as absolute values or as differential values represented in units of several bytes or units of OFDM symbols, would be a TXVECTOR parameter that is present for each sub-band.

For the first solution described above (e.g., see FIG. 5), the length LO for one payload (which is the payload that has the largest length) and the differential length Dx for all other sub-bands are present as TXVECTOR parameters. In one embodiment, these values are represented by the array (LO, Dx1, Dx2) for all the payloads that the AP decides to fit in a DL OFDMA PPDU, where the number of bits used to represent LO is e.g., 16 bits and the number of bits used to represent Ds value is e.g., 6 bits. The LO, Dx1, Dx2, TXVECTOR parameters are placed in the fields of HE SIG-A or HE SIG-B where the number of bits for LO is e.g., 16 bits and the number of bits used to represent Ds value is e.g., 6 bits. In a STA that is a recipient of one the payloads in a DL OFDMA PPDU, the STA first finds out which of the payloads belong to the STA (by using AID or PAID values that are associated to each payload) and then it passes LO and the appropriate Ds values as RXVECTOR parameters to the MAC layer (e.g., 211 of FIG. 2). Then MAC layer calculates the actual length of the payload that belongs to the STA and notifies PHY (e.g., 215 of FIG. 2) to process the received payload up to the length that is denoted by LO-Dx (in units of U bytes).

For the second solution described above (e.g., see FIG. 13A), the total number of payload symbols in the received DL OFDMA PPDU, Nsym, and the differential length Ds for all sub-bands are present as TXVECTOR parameters. In one embodiment, these values are represented by the array (Ds1, Ds2) for all the payloads that the AP decides to fit in a DL OFDMA PPDU, where the number of bits used to represent Ds values is e.g., 6 bits. The Ds1, Ds2, TXVECTOR parameters are placed in the fields of HE SIG-A or HE SIG-B where the number of bits for each Ds value is e.g., 6 bits. In a STA that is recipient of one the payloads in a DL OFDMA PPDU, the STA first finds out which of the payloads belong to the STA (by using AID or PAID values that are associated to each payload) and then it the appropriate Ds value as RXVECTOR parameters to the MAC layer. Then MAC layer calculates the actual length of the payload that belongs to the STA and notifies PHY to process the received payload up to the OFDM symbol that is denoted by Nsym-Ds.

For the third solution described above (e.g., see FIG. 13B), the length LO for one sub-band (which is the payload that has the largest length) and the total number of payload symbols in the received DL OFDMA PPDU, Nsym, and the differential lengths Ds and Dz for all sub-bands are present as TXVECTOR parameters. In one embodiment, these values are represented by the array (LO, Ds1, Ds2, Dz1, Dz2) for all the payloads that the AP decides to fit in a DL OFDMA PPDU, where the number of bits used to represent Ds values is e.g., 6 bits. The Ds1, Ds2, Dz1, Dz2, TXVECTOR parameters are placed in the fields of HE SIG-A or HE SIG-B where the number of bits for each Ds value is e.g., 6 bits. In a STA that is recipient of one the payloads in a DL OFDMA PPDU, the STA first finds out which of the payloads belong to the STA (by using AID or PAID values that are associated to each payload) and then the appropriate Dz value as RXVECTOR parameters to the MAC layer. Then MAC layer calculates the actual length of the payload that belongs to the STA and notifies PHY to process the received payload up to the OFDM symbol that is denoted by Nsym-Ds and to ignore the last LO-Dz bytes.

FIGS. 14A-14C illustrate flow charts of examples of aggregation methods for DL OFDMA operation. For explanatory and illustration purposes, the example processes 1410, 1420 and 1430 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 1410, 1420 and 1430 are not limited to the wireless communication devices 111-115 of FIG. 1 or their components, and the example processes 1410, 1420 and 1430 may be performed by some of the devices shown in FIG. 1, or other devices or components. Further for explanatory and illustration purposes, the blocks of the example processes 1410, 1420 and 1430 are described herein as occurring in serial or linearly. However, multiple blocks of the example processes 1410, 1420 and 1430 may occur in parallel. In addition, the blocks of the example processes 1410, 1420 and 1430 need not be performed in the order shown and/or one or more of the blocks/actions of the example processes 1410, 1420 and 1430 need not be performed. Various examples of aspects of the disclosure are described below as clauses for convenience. These are provided as examples, and do not limit the subject technology. As an example, some of the clauses described below are illustrated in FIGS. 14A through 14C.

The embodiments provided herein have been described with reference to a wireless LAN system; however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Clause A. A station for facilitating multi-user communication in a wireless network, the station comprising: one or more memories; and one or more processors coupled to the one or more memories, the one or more processors configured to cause: receiving a downlink frame, the downlink frame comprising a first signaling field and a second signaling field; determining whether the first signaling field indicates a multi-user (MU)-multi-input multi-output (MIMO) transmission in the downlink frame; when the first signaling field indicates the MU-MIMO transmission, determining one or more attributes of the MU-MIMO transmission in the second signaling field; when the first signaling field indicates a transmission that is a non-MU-MIMO transmission, determining one or more attributes of the non-MU-MIMO transmission in the second signaling field; decoding one or more portions of the downlink frame based on the one or more attributes of the MU-MIMO transmission or the one or more attributes of the non-MU-MIMO transmission; and providing the decoded one or more portions of the downlink frame for processing.

Clause B. A non-transitory computer-readable storage medium storing computer-executable instructions that, when executed by one or more processors, cause one or more processors to perform operations, the operations comprising: generating a downlink frame for a multi-user transmission, the downlink frame comprising a first signaling field and a second signaling field, wherein the first signaling field indicates whether the downlink frame is associated with a multi-user (MU)-multi-input multi-output (MIMO) transmission, wherein the second signaling field comprises one or more attributes of the MU-MIMO transmission when the downlink frame is associated with the MU-MIMO transmission, wherein the second signaling field comprises one or more attributes of a non-MU-MIMO transmission when the downlink frame is associated with the non-MU-MIMO transmission; and providing the downlink frame for the multi-user transmission directed to a plurality of stations.

Clause C. A computer-implemented method of facilitating multi-user communication in a wireless network, the method comprising: receiving a downlink frame, the downlink frame comprising a first signaling field and a second signaling field; determining whether the first signaling field indicates a multi-user (MU)-multi-input multi-output (MIMO) transmission in the downlink frame; when the first signaling field indicates the MU-MIMO transmission, determining one or more attributes of the MU-MIMO transmission in the second signaling field; decoding one or more portions of the downlink frame based on the one or more attributes of the MU-MIMO transmission; and providing the decoded one or more portions of the downlink frame for processing.

In one or more aspects, additional clauses are described below.

A method comprising one or more methods or operations described herein.

An apparatus comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of preceding a series of items, with the terms "and" or "or" to separate any of the items, modifies the list as a whole, rather than each member of the list. The phrase "at least one of does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An access point (AP), comprising:
a processing device; and
a memory unit coupled to the processing device, wherein the memory unit includes instructions that when executed by the processing device cause the wireless device to:
receive, from each of a plurality of stations (STAs), a transmission that includes a high efficiency (HE) capability field, which includes a subfield that indicates whether the STA supports downlink multi-user multiple input multiple output (DL MU MIMO) in an orthogonal frequency division multiple access (OFDMA) sub-band via a single capability bit;
determine, from the capability bit, a first set of STAs of the plurality of STAs that are capable to receive DL MU MIMO transmissions;
determine, from the capability bit, a second set of STAs that are not capable to receive DL MU MIMO transmissions; and
transmit a downlink orthogonal frequency division multiple access protocol data unit (DL OFDMA PPDU) to the first set of STAs over sub-bands that are capable of DL MU MIMO and to the second set of STAs over sub-bands that are not capable of DL MU MIMO, wherein a bandwidth of OFDMA-sub-bands that are capable of receiving DL MU MIMO and a bandwidth of sub-bands that are not capable of receiving DL MU MIMO are different.

2. The AP of claim 1, wherein an MU sub-band indicates and addresses SU and MU transmissions within the DL OFDMA PPDU.

3. The AP of claim 2, wherein the MU sub-band includes a sub-band ID (SID) and a group ID (GID) that indicate the group ID that a sub-band is using.

4. The AP of claim 3, wherein the GID value indicates single-user (SU) transmission, wherein the GID value indicates DL MU MIMO transmission to STAs that are a member of a same GID.

5. The AP of claim 3, wherein the AP determines that no sub-bands are capable of DL MU MIMO transmission, and in response all GID values indicate SU transmission.

6. The AP of claim 3, wherein the AP reuses GID values to allow more GID values to be used for MU MIMO transmissions.

7. The AP of claim 1, wherein a length of an HE-SIG-B field associated with MU MIMO transmission is shorter than a length of an HE-SIG-B field associated with SU MIMO transmission.

8. A method, comprising:

receiving, from each of a plurality of stations (STAs), a transmission including a high efficiency (HE) capability field, which includes a subfield indicating whether the STA supports downlink multi-user multiple input multiple output (DL MU MIMO) in an orthogonal frequency division multiple access (OFDMA) sub-band via a single capability bit;

determining, by an access point (AP) using the capability bit, a first set of STAs of the plurality of STAs that are capable to receive DL MU MIMO transmissions;

determining, by the AP using the capability bit, a second set of STAs that are not capable to receive DL MU MIMO-transmissions; and transmitting, by the AP, a downlink orthogonal frequency division multiple access protocol data unit (DL OFDMA PPDU) to the first set of STAs over sub-bands that are capable of DL MU MIMO and to the second set of STAs over sub-bands that are not capable of DL MU MIMO, wherein a bandwidth of OFDMA sub-bands that are capable of receiving DL MU MIMO and a bandwidth of sub-bands that are not capable of receiving DL MU MIMO are different.

9. The method of claim 8, wherein an MU sub-band indicates and addresses SU and MU transmissions within the DL OFDMA PPDU.

10. The method of claim 9, wherein the MU sub-band includes a sub-band ID (SID) and a group ID (GID) that indicate the group ID that a sub-band is using.

11. The method of claim 10, wherein the GID value indicates single-user (SU) transmission, wherein the GID value indicates DL MU MIMO transmission to STAs that are a member of a same GID.

12. The method of claim 10, further comprising:

determining, by the AP, that no sub-bands are capable of DL MU MIMO transmission, and in response all GID values indicate SU transmission.

13. The method of claim 10, further comprising:

reusing GID values, by the AP, to allow more GID values to be used for MU MIMO transmissions.

14. The method of claim 8 wherein a length of an HE-SIG-B field associated with MU MIMO transmission is shorter than a length of an HE-SIG-B field associated with SU MIMO transmission.

15. A non-transitory machine-readable storage medium comprising instructions, which when executed by one or more processors of an access point (AP) in a wireless network, cause the AP to perform:

receiving, from each of a plurality of stations (STAs), a transmission including a high efficiency (HE) capability field, which includes a subfield indicating whether the STA supports downlink multi-user multiple input multiple output (DL MU MIMO) in an orthogonal frequency division multiple access (OFDMA) sub-band via a single capability bit;

determining, using the capability bit, a first set of STAs of the plurality of STAs that are capable to receive DL MU MIMO transmissions;

determining, using the capability bit, a second set of STAs that are not capable to receive DL MU MIMO-transmissions; and transmitting a downlink orthogonal frequency division multiple access protocol data unit (DL OFDMA PPDU) to the first set of STAs over sub-bands that are capable of DL MU MIMO and to the second set of STAs over sub-bands that are not capable of DL MU MIMO, wherein a bandwidth of the OFDMA sub-bands that are capable of receiving DL MU MIMO and a bandwidth of sub-bands that are not capable of receiving DL MU MIMO are different.

16. The non-transitory machine-readable storage medium of claim 15, wherein an MU sub-band indicates and addresses SU and MU transmissions within the DL OFDMA PPDU.

17. The non-transitory machine-readable storage medium of claim 16, wherein the MU sub-band includes a sub-band ID (SID) and a group ID (GID) that indicate the group ID that a sub-band is using.

18. The non-transitory machine-readable storage medium of claim 17, wherein the GID value indicates single-user (SU) transmission, wherein the GID value indicates DL MU MIMO transmission to STAs that are a member of a same GID.

19. The non-transitory machine-readable storage medium of claim 17, wherein the instructions, when executed by the processing device, further cause the AP to perform:

determining, by the AP, that no sub-bands are capable of DL MU MIMO transmission, and in response all GID values indicate SU transmission.

20. The non-transitory machine-readable storage medium of claim 17, wherein the instructions, when executed by the processing device, further cause the AP to perform:

reusing GID values, by the AP, to allow more GID values to be used for MU MIMO transmissions.

* * * * *